US011908361B2

(12) United States Patent
Furukawa et al.

(10) Patent No.: US 11,908,361 B2
(45) Date of Patent: Feb. 20, 2024

(54) DISPLAY DEVICE AND DRIVING METHOD THEREFOR

(71) Applicant: Sharp Kabushiki Kaisha, Sakai (JP)

(72) Inventors: Hiroyuki Furukawa, Sakai (JP); Chie Toridono, Sakai (JP); Masafumi Ueno, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 18/030,283

(22) PCT Filed: Oct. 8, 2020

(86) PCT No.: PCT/JP2020/038181
§ 371 (c)(1),
(2) Date: Apr. 5, 2023

(87) PCT Pub. No.: WO2022/074797
PCT Pub. Date: Apr. 14, 2022

(65) Prior Publication Data

US 2023/0368708 A1 Nov. 16, 2023

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0452* (2013.01); (Continued)

(58) Field of Classification Search
USPC .......... 345/690
See application file for complete search history.

(56) References Cited

U.S. PATENT DOCUMENTS

2003/0063053 A1 4/2003 Yamazaki et al.
2006/0208656 A1 9/2006 Hara
(Continued)

FOREIGN PATENT DOCUMENTS

JP 2003-177713 A 6/2003
JP 2006-259530 A 9/2006
(Continued)

OTHER PUBLICATIONS

Official Communication issued in International Patent Application No. PCT/JP2020/038181, dated Nov. 24, 2020.

*Primary Examiner* — Chineyere D Wills-Burns
(74) *Attorney, Agent, or Firm* — Keating & Bennett, LLP

(57) ABSTRACT

The display device is provided with a degree-of-degradation calculating circuit that determines a degree of degradation representing a level of degradation of a compensation-target circuit element included in each of K pixel circuits which are some or all of a plurality of pixel circuits; a variation coefficient calculating circuit that calculates, as a variation coefficient, a value depending on a deviation determined based on degrees of degradation of the K pixel circuits; a reference luminance setting circuit that sets, based on the variation coefficient, reference luminance for determining display luminance of each display element after degradation compensation; and a compensation computing circuit that compensates for degradation of the compensation-target circuit elements by correcting input video signals based on the reference luminance and the degree of degradation of each of the K pixel circuits, upon generating video signals to be supplied to the plurality of pixel circuits.

20 Claims, 20 Drawing Sheets

(52) U.S. Cl.
CPC . *G09G 2300/0842* (2013.01); *G09G 2310/08* (2013.01); *G09G 2320/0233* (2013.01); *G09G 2320/045* (2013.01); *G09G 2320/0626* (2013.01); *G09G 2330/08* (2013.01); *G09G 2330/12* (2013.01); *G09G 2360/16* (2013.01)

(56) References Cited

U.S. PATENT DOCUMENTS

| | | | | |
|---|---|---|---|---|
| 2009/0147032 | A1 | 6/2009 | Kim | |
| 2014/0160142 | A1* | 6/2014 | Lee | G09G 3/3208 345/589 |
| 2016/0343302 | A1* | 11/2016 | Han | G09G 3/3233 |
| 2017/0162103 | A1* | 6/2017 | An | G09G 3/3208 |
| 2017/0213493 | A1* | 7/2017 | Han | G09G 3/3208 |
| 2018/0033372 | A1* | 2/2018 | Kishi | G09G 3/3233 |
| 2018/0366061 | A1* | 12/2018 | Furukawa | G09G 3/20 |
| 2019/0164503 | A1* | 5/2019 | An | G09G 3/3266 |
| 2020/0058251 | A1* | 2/2020 | Lee | G09G 3/3225 |
| 2020/0111455 | A1* | 4/2020 | Lee | G09G 3/2007 |
| 2020/0372861 | A1* | 11/2020 | Ok | G09G 3/3233 |
| 2021/0217368 | A1* | 7/2021 | Sohn | G09G 3/3291 |
| 2022/0036823 | A1* | 2/2022 | Iwauchi | G09G 3/3233 |

FOREIGN PATENT DOCUMENTS

| | | | |
|---|---|---|---|
| JP | 2009-141302 | A | 6/2009 |
| JP | 2011-253056 | A | 12/2011 |
| JP | 2018-120180 | A | 8/2018 |

* cited by examiner

Fig.12
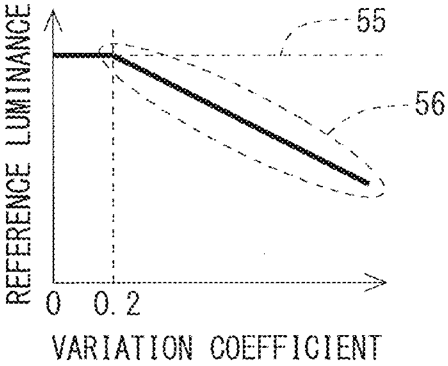
Fig.13
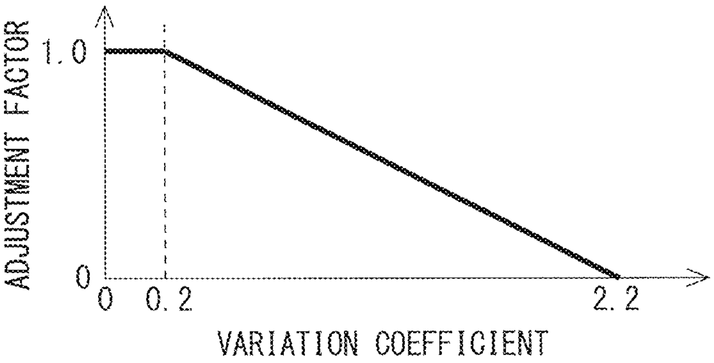
Fig.14
| CRITICAL POINT | SLOPE |
|---|---|
| 0.2 | 0 |
| 2.2 | -0.5 |

DISPLAY DEVICE AND DRIVING METHOD THEREFOR

TECHNICAL FIELD

The following disclosure relates to a display device and a driving method for the display device, and more specifically to a display device including pixel circuits each including a display element driven by current, such as an organic EL element, and a driving method for the display device.

BACKGROUND ART

In recent years, an organic EL display device including pixel circuits each including an organic EL element has been put to practical use. The organic EL element is also called an organic light-emitting diode (OLED), and is a self-emissive display element that emits light at luminance depending on current flowing therethrough. As such, since the organic EL element is a self-emissive display element, the organic EL display device can easily achieve slimming down, a reduction in power consumption, an increase in luminance, etc., compared to a liquid crystal display device that requires a backlight, a color filter, and the like.

As drive systems for the organic EL display device, there are known a passive matrix system (also called a simple matrix system.) and an active matrix system. An organic EL display device that adopts the passive matrix system is simple in structure, but has difficulty in increasing size and increasing resolution. On the other hand, an organic EL display device that adopts the active matrix system (hereinafter, referred to as "active matrix-type organic EL display device".) can easily achieve an increase in size and an increase in resolution compared to the organic EL display device that adopts the passive matrix system.

In the active matrix-type organic EL display device, a plurality of pixel circuits are formed in matrix form. The pixel circuits of the active matrix-type organic EL display device each typically include an input transistor that selects a pixel; and a drive transistor that controls supply of current to an organic EL element. Note that in the following, current flowing through the organic EL element from the drive transistor may be referred to as "drive current".

For the organic EL display device, as the drive transistor, typically, a thin-film transistor (TFT) is adopted. However, a threshold voltage of the thin-film transistor changes by degradation. Multiple drive transistors are provided in a display unit, and the level of degradation differs between drive transistors, and thus, variations occur in the threshold voltage. As a result, variations in luminance occur, degrading display quality. In addition, the current efficiency (light-emission efficiency) of the organic EL element decreases over time. Thus, even if constant current is supplied to the organic EL element, luminance gradually decreases over time. As a result of those facts, burn-in occurs. Hence, there are proposed various types of processes (compensation processes) for compensating for degradation of the drive transistor or the organic EL element. Note that there are both of a case in which both the drive transistor and the organic EL element are targets for a compensation process and a case in which only one of the drive transistor and the organic EL element is a target for a compensation process. Hence, in the following, for the sake of convenience, a circuit element that is a target for a compensation process may be referred to as "compensation-target circuit element".

As one scheme for a compensation process, an external compensation scheme is known. According to the external compensation scheme, in order to detect a characteristic of a compensation-target circuit element, the magnitude of current flowing through the compensation-target circuit element under a predetermined condition is measured by a circuit provided external to a pixel circuit. Then, based on a result of the measurement, a video signal is corrected. By this, degradation of the compensation-target circuit element is compensated for.

Now, terms used in this specification will be described. A series of processes for measuring current flowing through a compensation-target circuit element under a predetermined condition to detect a characteristic of the compensation-target circuit element are referred to as "characteristic detection monitoring". In relation to this, a period during which the characteristic detection monitoring is performed is referred to as "characteristic detection period", a row that is a target for the characteristic detection monitoring is referred to as "monitoring row", and a voltage provided to the pixel circuit upon characteristic detection monitoring out of data voltages provided to a pixel circuit through a data line is referred to as "monitoring voltage". In addition, for the sake of convenience, a characteristic of the drive transistor is referred to as "TFT characteristic", and a characteristic of the organic EL element is referred to as "OLED characteristic". In addition, a period during which a compensation process can be performed to perform display at uniform luminance in all pixels for any gradation level is referred to as "compensable period". In addition, degradation of the compensation-target circuit element may be represented as "degradation of a pixel". In addition, in order to determine at what level of luminance each organic EL element is to emit light by a compensation process, there is a need to determine luminance that is used as a reference upon the determination of the level of luminance. Hence, luminance used as a reference for determining display luminance of each organic EL element (each display element) after degradation compensation is referred to as "reference luminance".

Meanwhile, luminance after a compensation process or the length of the compensable period depends on a mode of a compensation process, which will be described below. Note that in FIGS. 10, 11, and 26 to 29, the magnitude of the degree of degradation of three pixels Pa, Pb, and Pc is represented by the length in a vertical direction of a rectangle. Regarding this, as shown in FIG. 25, the larger the degree of degradation, the shorter the length in the vertical direction of the rectangle, and the smaller the degree of degradation, the longer the length in the vertical direction of the rectangle. In addition, the magnitude of compensation current is represented by the length of a bold arrow. Regarding this, an up bold arrow represents the amount of increase in drive current compared to a case of not performing a compensation process, and a down bold arrow represents the amount of decrease in drive current compared to a case of not performing a compensation process.

As one mode of a compensation process, there is a mode in which compensation is performed with reference to the luminance level of the most degraded pixel. In this mode, as shown in FIG. 26, to pixels other than the most degraded pixel there are supplied, as drive currents, currents whose amounts are smaller than their original amounts. Note that a dotted line given reference character 90 indicates an initial degree of degradation, and a dotted line given reference character 91 indicates the degree of degradation of the most degraded pixel. In this mode, the reference luminance decreases as degradation proceeds, and thus, if there is a pixel with great degradation, then display may become remarkably dark. Hence, Japanese Laid-Open Patent Publication No. 2009-141302 describes that by adjusting the voltage value of a first power supply voltage which is a high-level power supply voltage supplied to a pixel circuit, the luminance value of white is maintained constant. However, when the voltage value of the first power supply voltage is increased, a characteristic of a drive transistor changes, and thus, gradation characteristics change. In addition, a circuit for making the voltage value of the first power supply voltage variable is a complex circuit, and thus, a cost increase is necessary.

Further, there is a mode in which compensation is performed with reference to an initial luminance level to prevent a reduction in luminance associated with proceeding of degradation of a pixel (degradation of a compensation-target circuit element) (see FIG. 27). For example, in a light-emitting device disclosed in Japanese Laid-Open Patent Publication No. 2003-177713, although the amount of current is corrected such that the most degraded pixel can obtain a desired gradation level, excessive current is supplied to other pixels, and thus, a process of reducing a gradation level for the other pixels is performed. In this mode, as can be grasped from FIG. 27, a compensation current needs to be increased as degradation proceeds. Hence, there is a disadvantage in that a pixel degrades with increasing speed.

In consideration of the above, in order to achieve a balance between luminance and the length of a compensable period, there is proposed a mode in which compensation is performed with reference to a luminance level corresponding to an average degree of degradation of all pixels (see FIG. 28). Note that a dotted line given reference character 92 in FIG. 28 indicates an average degree of degradation. As can be grasped from a comparison between FIGS. 27 and 28, in this mode, compared to a mode in which compensation is performed with reference to the initial luminance level, the magnitude of the compensation current is small. Therefore, speeding-up of degradation of a pixel (degradation of a compensation-target circuit element) is suppressed. In addition, although luminance gradually decreases as degradation proceeds, uniformity of luminance on the entire screen is maintained.

PRIOR ART DOCUMENTS

Patent Documents

[Patent Document 1] Japanese Laid-Open Patent Publication No. 2009-141302

[Patent Document 2] Japanese Laid-Open Patent Publication No. 2003-177713

SUMMARY

Problems to be Solved by the Invention

As described above, when compensation is performed with reference to a luminance level corresponding to an average degree of degradation of all pixels, speeding-up of degradation of a pixel is suppressed and uniformity of luminance on the entire screen is maintained. However, when variations in the degree of degradation of pixels in the entire display unit increase, since the compensation current remarkably increases for a pixel with great degradation like a pixel Pb of FIG. 29, degradation of the pixel accelerates. Hence, for the compensation process, a sufficient length of a compensable period is not obtained.

An object of the following disclosure is therefore to implement a compensation process that obtains a sufficient length of a compensable period in a display device including pixel circuits each including a display element (typically, an organic EL element) driven by current.

Means for Solving the Problems

A display device according to some embodiments of the present disclosure is a display device including a plurality of pixel circuits each including a display element driven by current and a drive transistor for controlling current to be supplied to the display element, the display device including:

a degree-of-degradation obtaining circuit configured to determine a degree of degradation representing a level of degradation of a compensation-target circuit element included in each of K pixel circuits, the compensation-target circuit element being at least one of the display element and the drive transistor, and the K pixel circuits being some or all of the plurality of pixel circuits;

an index value calculating circuit configured to calculate, as an index value, a value depending on a deviation determined based on degrees of degradation of the K pixel circuits;

a reference luminance setting circuit configured to set reference luminance based on the index value, the reference luminance being luminance used as a reference for determining display luminance of the display element after degradation compensation; and a compensation computing circuit configured to compensate for degradation of the compensation-target circuit elements by correcting input video signals based on the reference luminance and the degree of degradation of each of the K pixel circuits, upon generating video signals to be supplied to the plurality of pixel circuits.

A display device according to some other embodiments of the present disclosure is a display device including a plurality of pixel circuits each including a display element driven by current and a drive transistor for controlling current to be supplied to the display element, the display device including:

a degree-of-degradation obtaining circuit configured to determine a degree of degradation representing a level of degradation of a compensation-target circuit element included in each of K pixel circuits, the compensation-target circuit element being at least one of the display element and the drive transistor, and the K pixel circuits being some or all of the plurality of pixel circuits;

an index value calculating circuit configured to calculate, as an index value, a value depending on a deviation determined based on degrees of degradation of the K pixel circuits;

a reference current setting circuit configured to set a reference current corresponding to reference luminance based on the index value, the reference luminance being luminance used as a reference for determining display luminance of the display element after degradation compensation; and a compensation computing circuit configured to compensate for degradation of the compensation-target circuit elements by correcting input video signals based on the reference current and the degree of degradation of each of the K pixel circuits, upon generating video signals to be supplied to the plurality of pixel circuits.

A driving method (for a display device) according to some embodiments of the present disclosure is a driving method for a display device including a plurality of pixel circuits each including a display element driven by current and a drive transistor for controlling current to be supplied to the display element, the driving method including:

a degree-of-degradation calculating step of determining a degree of degradation representing a level of degradation of a compensation-target circuit element included in each of K pixel circuits, the compensation-target circuit element being at least one of the display element and the drive transistor, and the K pixel circuits being some or all of the plurality of pixel circuits;

an index value calculating step of calculating, as an index value, a value depending on a deviation determined based on degrees of degradation of the K pixel circuits;

a reference value setting step of setting, as a reference value, reference luminance or reference current corresponding to the reference luminance, based on the index value, the reference luminance being luminance used as a reference for determining display luminance of the display element after degradation compensation; and a compensation computing step of compensating for degradation of the compensation-target circuit elements by correcting input video signals based on the reference value and the degree of degradation of each of the K pixel circuits, upon generating video signals to be supplied to the plurality of pixel circuits.

Effects of the Invention

According to some embodiments of the present disclosure, reference luminance (luminance used as a reference for determining display luminance of each display element after degradation compensation) is set based on variations in the degree of degradation of compensation-target circuit elements. Thus, for example, when the variations in the degree of degradation are small, the reference luminance is set to luminance corresponding to an average degree of degradation, by which speeding-up of degradation of the compensation-target circuit elements can be suppressed while a remarkable darkening of display is suppressed, and when the variations in the degree of degradation is large, the reference luminance is set to luminance lower than the luminance corresponding to the average degree of degradation, by which further speeding-up of degradation of a remarkably degraded compensation-target circuit element can be suppressed. As such, not only when variations in the degree of degradation are small, but also when variations in the degree of degradation are large, speeding-up of degradation of compensation-target circuit elements can be suppressed. From the above, a display device including pixel circuits each including a display element driven by current implements a compensation process that obtains a sufficient length of a compensable period.

BRIEF DESCRIPTION OF THE DRAWINGS

FIG. 12 is a diagram showing an example of a relationship between a variation coefficient and the reference luminance in the first embodiment.

FIG. 13 is a diagram showing an example of a relationship between the variation coefficient and an adjustment factor in the first embodiment.

FIG. 14 is a diagram for describing parameters required to calculate the adjustment factor in the first embodiment.

MODES FOR CARRYING OUT THE INVENTION

Embodiments will be described below with reference to the accompanying drawings. Note that in the following, it is assumed that M and N are integers greater than or equal to 2, i is an integer between 1 and N, inclusive, and j is an integer between 1 and M, inclusive.

1. First Embodiment

<1.1 Overall Configuration and Summary>

Figure 1:
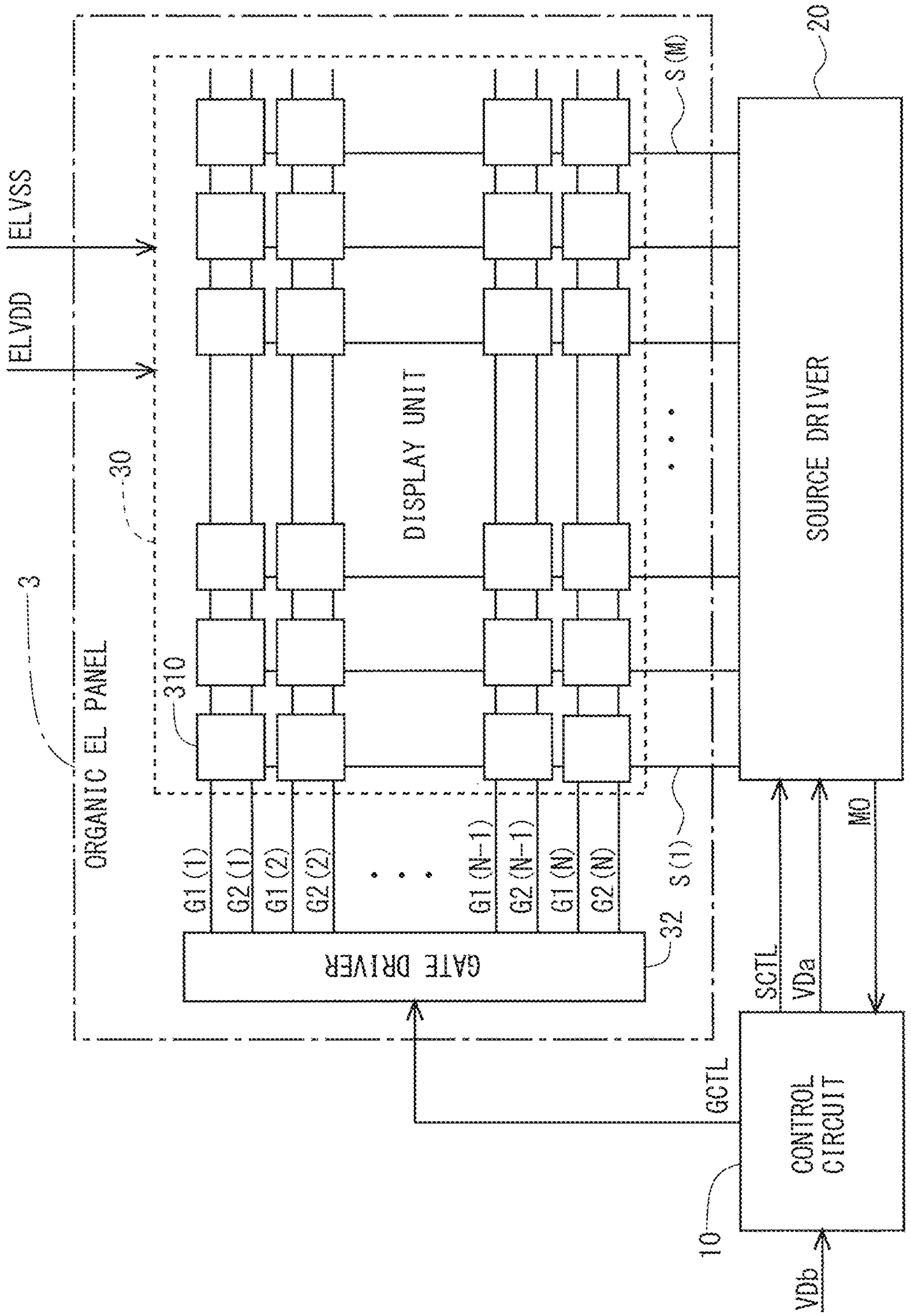
FIG. 1 is a block diagram showing an overall configuration of an active matrix-type organic EL display device according to a first embodiment.

FIG. 1 is a block diagram showing an overall configuration of an active matrix-type organic EL display device according to a first embodiment. The organic EL display device is a display device that performs monochrome display, and includes a control circuit 10, a source driver 20, a gate driver 32, and a display unit 30. Note that in the present embodiment, the gate driver 32 is formed on a board that forms an organic EL panel 3 including the display unit 30. That is, the gate driver 32 is monolithically formed. Note, however, that a configuration in which the gate driver 32 is not monolithically formed can also be adopted.

In the display unit 30 there are disposed M data lines S(1) to S(M) and N scanning lines G1(1) to G1(N) intersecting the M data lines S(1) to S(M). In addition, in the display unit 30 there are disposed N monitoring control lines G2(1) to G2(N) so as to have a one-to-one correspondence with the N scanning lines G1(1) to G1(N). The scanning lines G1(1) to G1(N) and the monitoring control lines G2(1) to G2(N) are parallel to each other. Furthermore, in the display unit 30 there are provided N×M pixel circuits 310 at respective intersections of the N scanning lines G1(1) to G1(N) and the M data lines S(1) to S(M). By thus providing the N×M pixel circuits 310, a pixel matrix of N rows×M columns is formed in the display unit 30. In addition, in the display unit 30 there are disposed a high-level power line (not shown) that supplies a high-level power supply voltage ELVDD and a low-level power line (not shown) that supplies a low-level power supply voltage ELVSS.

Note that in the following, when the M data lines S(1) to S(M) do not need to be distinguished from each other, the data line is simply given reference character S. Likewise, when the N scanning lines G1(1) to G1(N) do not need to be distinguished from each other, the scanning line is simply given reference character G1, and when the N monitoring control lines G2(1) to G2(N) do not need to be distinguished from each other, the monitoring control line is simply given reference character G2.

The control circuit 10 receives image data VDb sent from an external source and monitoring data MO outputted from the source driver 20, and performs a compensation computation process (described later) on the image data VDb based on the monitoring data MO, thereby generating digital video signals (image data having been subjected to the compensation computation process) VDa to be provided to the source driver 20. Note that the monitoring data MO is data representing the value of current measured to detect a TFT characteristic or an OLED characteristic. The control circuit 10 also controls the operation of the source driver 20 by providing the digital video signals VDa and source control signals SCTL to the source driver 20, and controls the operation of the gate driver 32 by providing gate control signals GCTL to the gate driver 32. The source control signals SCTL include a source start pulse signal, a source clock signal, a latch strobe signal, etc. The gate control signals GCTL include a gate start pulse signal, a gate clock signal, an output enable signal, etc.

The gate driver 32 is connected to the N scanning lines G1(1) to G1(N) and the N monitoring control lines G2 (1) to G2(N). The gate driver 32 is composed of a shift register, a logic circuit, and the like. The gate driver 32 drives the N scanning lines G1(1) to G1(N) and the N monitoring control lines G2(1) to G2(N), based on the gate control signals GCTL outputted from the control circuit 10.

Figure 2:
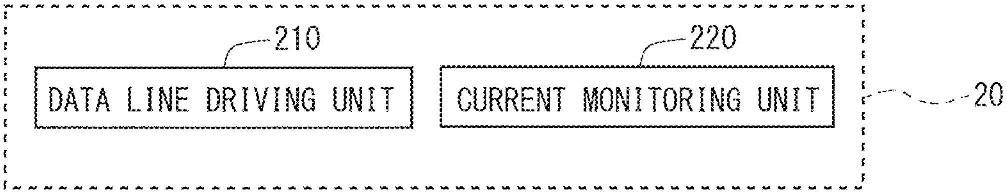
FIG. 2 is a diagram for describing functions of a source driver in the first embodiment.

The source driver 20 is connected to the M data lines S(1) to S(M). The source driver 20 selectively performs the operation of driving the data lines S(1) to S(M) and the operation of measuring currents flowing through the data lines S(1) to S(M). That is, as shown in FIG. 2, the source driver 20 functionally includes a portion that functions as a data line driving unit 210 that drives the data lines S(1) to S(M); and a portion that functions as a current monitoring unit 220 that measures currents flowing between the pixel circuits 310 and the data lines S. The current monitoring unit 220 outputs monitoring data MO generated based on the measurement values of the currents.

By driving the N scanning lines G1(1) to G1(N), the N monitoring control lines G2(1) to G2(N), and the M data lines S(1) to S(M) in the above-described manner, an image based on the image data VDb sent from the external source is displayed on the display unit 30. Upon the display, a compensation computation process is performed on the image data VDb based on the monitoring data MO, by which degradation of drive transistors or organic EL elements is compensated for.

<1.2 Pixel Circuits and the Source Driver>

Next, the pixel circuits 310 and the source driver 20 will be described in detail. The source driver 20 performs the following operation when functioning as the data line driving unit 210. The source driver 20 receives source control signals SCTL outputted from the control circuit 10 and applies, as data voltages, video signal voltages generated based on target luminance to the respective M data lines S(1) to S(M). Regarding this, the source driver 20 sequentially holds digital video signals VDa indicating voltages to be applied to the respective data lines S, at timing at which a pulse of a source clock signal is generated, triggered by a pulse of a source start pulse signal. Then, the held digital video signals VDa are converted into analog voltages at timing at which a pulse of a latch strobe signal is generated. The converted analog voltages are simultaneously applied as data voltages to all data lines S(1) to S(M). When the source driver 20 functions as the current monitoring unit 220, the source driver 20 applies a monitoring voltage to the data lines S(1) to S(M), obtains, as analog data, currents flowing through the data lines S(1) to S(M), and converts the analog data into digital data. The converted digital data is outputted as monitoring data MO from the source driver 20.

Figure 3:
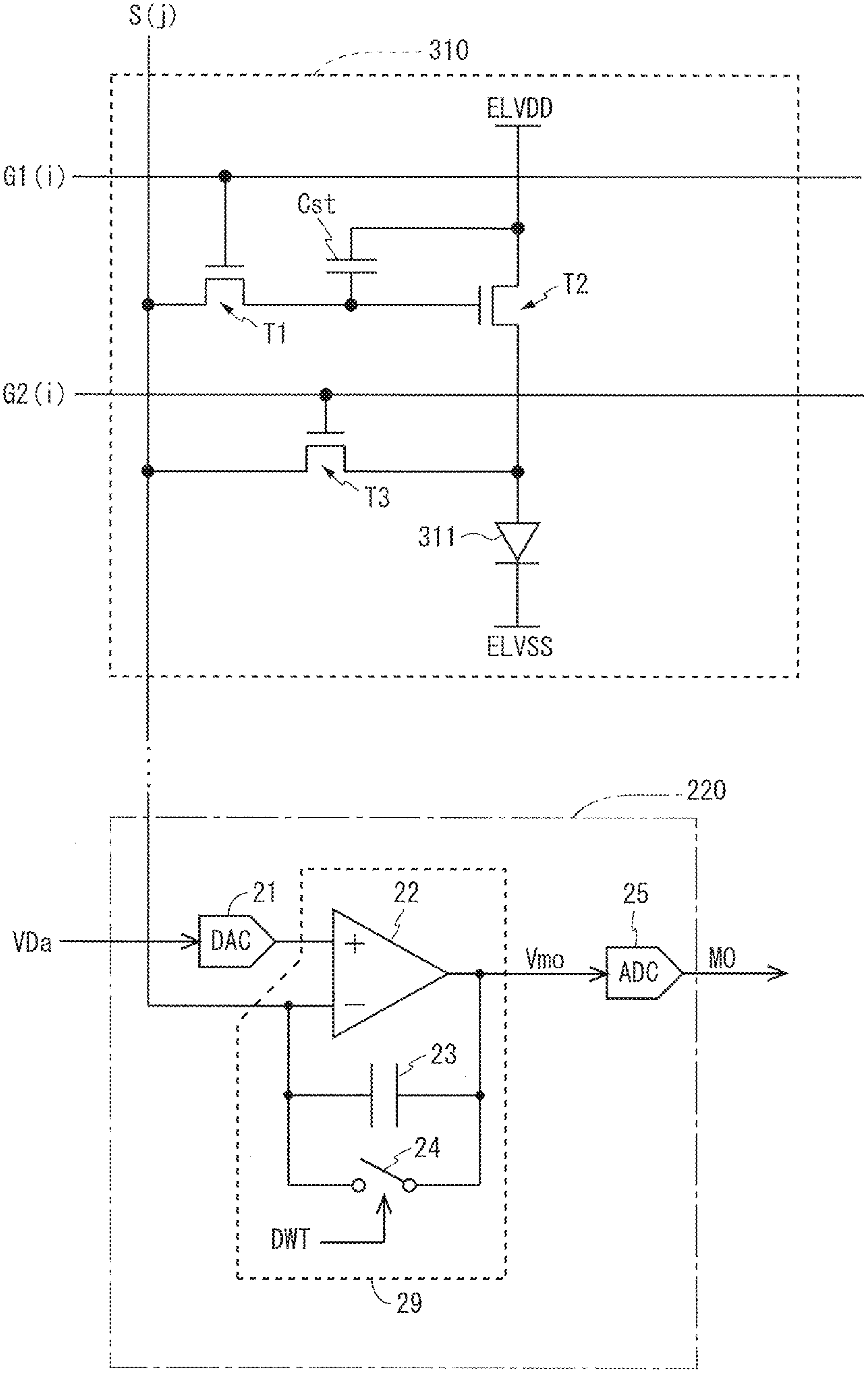
FIG. 3 is a circuit diagram showing a pixel circuit and a part of the source driver (a portion that functions as a current monitoring unit) in the first embodiment.

FIG. 3 is a circuit diagram showing a pixel circuit 310 and a part of the source driver 20 (a portion that functions as the current monitoring unit 220). Note that FIG. 3 shows a pixel circuit 310 in an ith row and a jth column and a portion of the source driver 20 corresponding to a data line S(j) in the jth column. The pixel circuit 310 includes one organic EL element 311, three transistors T1 to T3, and one capacitor Cst. The transistor T1 functions as an input transistor that selects a pixel, the transistor T2 functions as a drive transistor that controls supply of current to the organic EL element 311, and the transistor T3 functions as a monitoring control transistor that controls whether to perform current measurement for detecting a characteristic of the drive transistor T2 or the organic EL element 311.

The input transistor T1 is connected at its control terminal to a scanning line G1(i), connected at its first conductive terminal to the data line S(j), and connected at its second conductive terminal to a control terminal of the drive transistor T2 and a first electrode of the capacitor Cst. The drive transistor T2 is connected at its control terminal to the second conductive terminal of the input transistor T1 and the first electrode of the capacitor Cst, connected at its first conductive terminal to a high-level power line and a second electrode of the capacitor Cst, and connected at its second conductive terminal to a first conductive terminal of the monitoring control transistor T3 and an anode terminal of the organic EL element 311. The monitoring control transistor T3 is connected at its control terminal to a monitoring control line G2(i), connected at its first conductive terminal to the second conductive terminal of the drive transistor T2 and the anode terminal of the organic EL element 311, and connected at its second conductive terminal to the data line S(j). The capacitor Cst is connected at its first electrode to the control terminal of the drive transistor T2 and the second conductive terminal of the input transistor T1, and connected at its second electrode to the first conductive terminal of the drive transistor T2 and the high-level power line. The organic EL element 311 is connected at its anode terminal to the second conductive terminal of the drive transistor T2 and the first conductive terminal of the monitoring control transistor T3, and connected at its cathode terminal to a low-level power line.

As shown in FIG. 3, the current monitoring unit 220 includes a DA converter (DAC) 21, an operational amplifier 22, a capacitor 23, a switch 24, and an AD converter (ADC) 25. The operational amplifier 22, the capacitor 23, and the switch 24 constitute a current/voltage converting unit 29. Note that the current/voltage converting unit 29 and the DA converter 21 also function as components of the data line driving unit 210.

A digital video signal VDa is provided to an input terminal of the DA converter 21. The DA converter 21 converts the digital video signal VDa into an analog voltage. The analog voltage is a video signal voltage or a monitoring voltage. An output terminal of the DA converter 21 is connected to a non-inverting input terminal of the operational amplifier 22. Accordingly, a video signal voltage or a monitoring voltage is provided to the non-inverting input terminal of the operational amplifier 22. An inverting input terminal of the operational amplifier 22 is connected to the data line S(j). The switch 24 is provided between the inverting input terminal and output terminal of the operational amplifier 22. The capacitor 23 is provided in parallel to the switch 24 and between the inverting input terminal and output terminal of the operational amplifier 22. An input and output control signal DWT included in source control signals SCTL is provided to a control terminal of the switch 24. The output terminal of the operational amplifier 22 is connected to an input terminal of the AD converter 25.

In a configuration such as that described above, when the input and output control signal DWT is at a high level, the switch 24 is in an on state, and a short-circuit state occurs between the inverting input terminal and output terminal of the operational amplifier 22. At this time, the operational amplifier 22 functions as a buffer amplifier. By this, a voltage (a video signal voltage or a monitoring voltage) provided to the non-inverting input terminal of the operational amplifier 22 is applied to the data line S(j). When the input and output control signal DWT is at a low level, the switch 24 is in an off state, and the inverting input terminal and output terminal of the operational amplifier 22 are connected to each other through the capacitor 23. At this time, the operational amplifier 22 and the capacitor 23 function as an integrator circuit. By this, an output voltage from the operational amplifier 22 is a voltage depending on current flowing through the data line S(j). The AD converter 25 converts the output voltage from the operational amplifier 22 into a digital value. Data obtained after the conversion is sent as monitoring data MO to the control circuit 10.

Note that although, in the present embodiment, it is configured such that a signal line for supplying data voltages (a video signal voltage and a monitoring voltage) and a signal line for measuring current are a shared signal line, the configuration is not limited thereto. A configuration can also be adopted in which a signal line for supplying data voltages and a signal line for measuring current are provided independently of each other. In addition, for the configuration of the pixel circuit 310, too, other configurations than the configuration shown in FIG. 3 can also be adopted. That is, there are no particular limitations on specific circuit configurations of the current monitoring unit 220 and the pixel circuit 310.

<1.3 Compensation Process>

A compensation process of the present embodiment will be described below.

<1.3.1 Outline>

Figure 4:
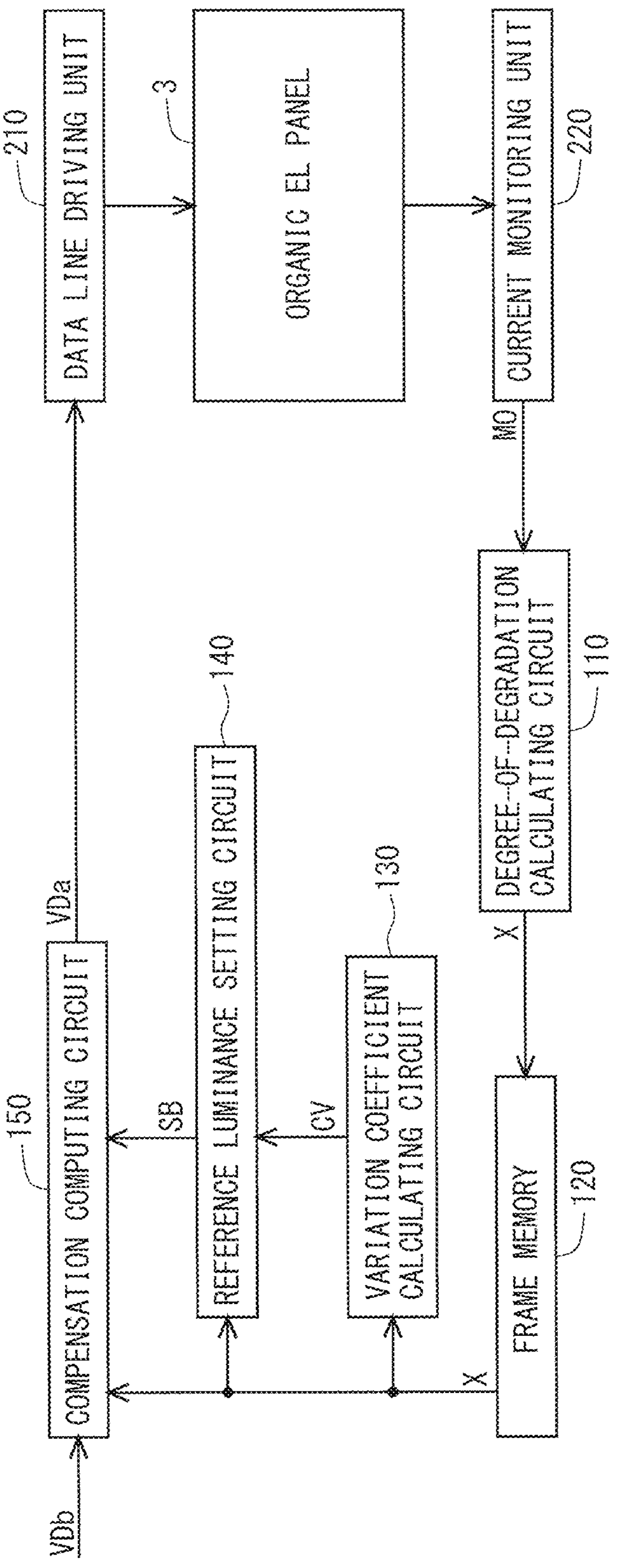
FIG. 4 is a block diagram for describing a schematic configuration for a compensation process in the first embodiment.

FIG. 4 is a block diagram for describing a schematic configuration for a compensation process. The organic EL display device according to the present embodiment includes a degree-of-degradation calculating circuit 110, a frame memory 120, a variation coefficient calculating circuit 130, a reference luminance setting circuit 140, and a compensation computing circuit 150, in addition to the above-described current monitoring unit 220 and data line driving unit 210, as components for a compensation process for compensating for degradation of a compensation-target circuit element (at least one of the organic EL element 311 and the drive transistor T2) in the pixel circuit 310. In the present embodiment, a current measuring circuit is implemented by the current monitoring unit 220, and a degree-of-degradation obtaining circuit is implemented by the current monitoring unit 220 and the degree-of-degradation calculating circuit 110. Note that the degree-of-degradation calculating circuit 110, the frame memory 120, the variation coefficient calculating circuit 130, the reference luminance setting circuit 140, and the compensation computing circuit 150 are components in the control circuit 10 (see FIG. 1).

The current monitoring unit 220 measures, for each of the N×M pixel circuits 310 in the display unit 30, current flowing through a compensation-target circuit element under a predetermined condition. Then, the current monitoring unit 220 outputs monitoring data MO representing the measurement values of the currents.

Figure 5:
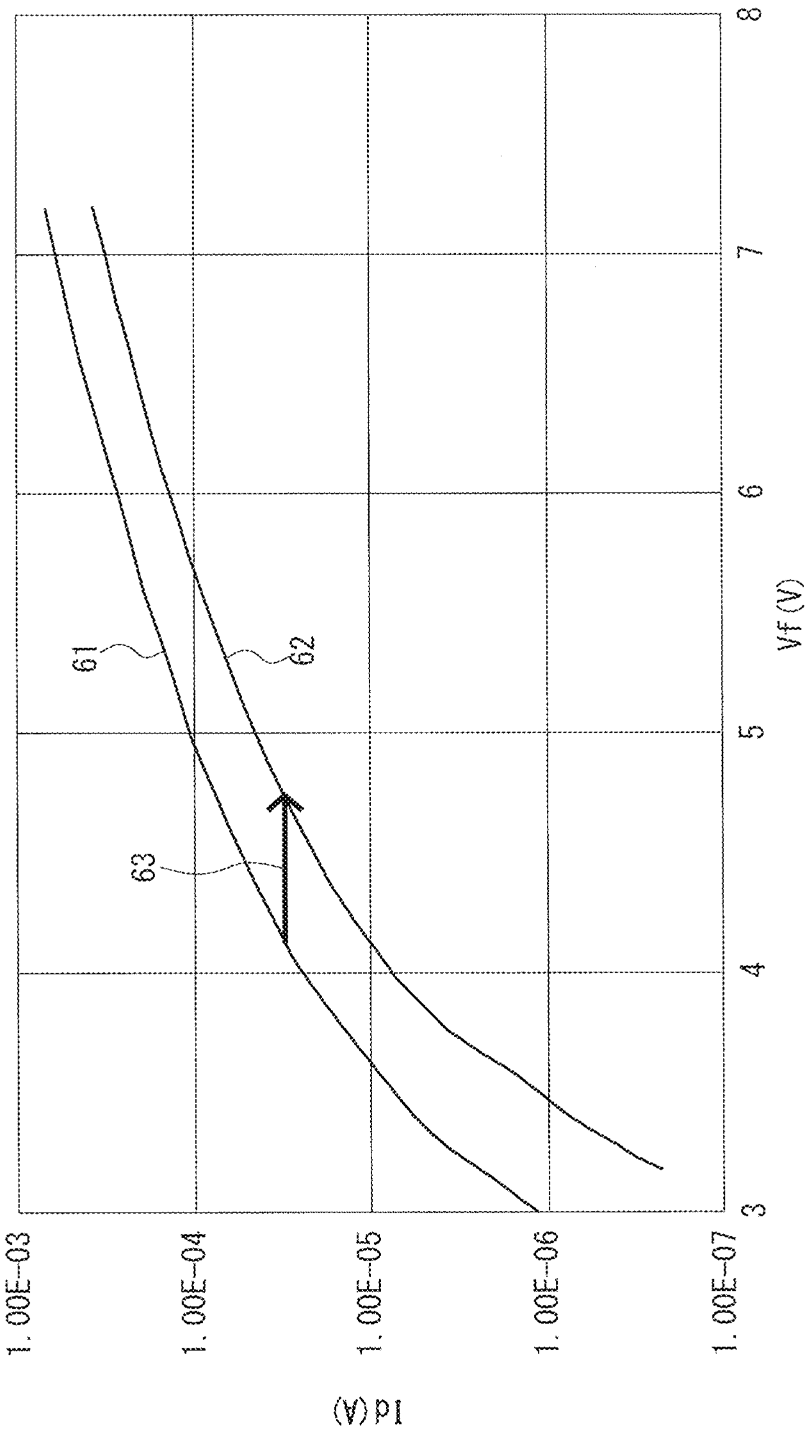
FIG. 5 is an I-V characteristic diagram for describing the degree of degradation in the first embodiment.

The degree-of-degradation calculating circuit 110 calculates a degree of degradation X representing the level of degradation of each compensation-target circuit element, based on the monitoring data MO. In other words, the degree-of-degradation calculating circuit 110 calculates a degree of degradation X based on current measured by the current monitoring unit 220. That is, the degree-of-degradation calculating circuit 110 performs conversion from a current value to a degree of degradation X. Regarding this, for a transistor, a curve representing an I-V characteristic (current-voltage characteristic) changes due to degradation, for example, from a curve given reference character 61 in FIG. 5 to a curve given reference character 62 in FIG. 5. The I-V characteristic changes due to degradation in this manner, and for example, the amount of change in threshold voltage from an initial state (the amount of change corresponds to the length of an arrow given reference character 63 in FIG. 5) can be treated as the degree of degradation X. Further, for example, the amount of reduction in mobility can also be treated as the degree of degradation X. Note that the reduction in mobility appears as a reduction in the slope of a curve representing an I-V characteristic.

Meanwhile, when only the drive transistor T2 is treated as a compensation-target circuit element, a degree of degradation X is calculated based on a current value measured to detect a TFT characteristic, and when only the organic EL element 311 is treated as a compensation-target circuit element, a degree of degradation X is calculated based on a current value measured to detect an OLED characteristic, and when both the drive transistor T2 and the organic EL element 311 are treated as compensation-target circuit elements, a degree of degradation X is calculated based on a current value measured to detect a TFT characteristic and a current value measured to detect an OLED characteristic.

The degrees of degradation (data on the degrees of degradation) X for one screen calculated by the degree-of-degradation calculating circuit 110 are saved in the frame memory 120.

The variation coefficient calculating circuit 130 calculates a variation coefficient CV of the degrees of degradation X based on the degrees of degradation X for one screen held in the frame memory 120. Here, assuming that the number of the pixel circuits 310 in the display unit 30 is K (i.e., N×M=K), a specific way of determining the variation coefficient CV will be described below. Note that with p being an integer between 1 and K, inclusive, the degree of degradation of each of the K pixel circuits 310 is represented by Xp.

First, as shown in the following equation (1), an average degree of degradation Xave is calculated by dividing a total sum of the degrees of degradation Xp of the K pixel circuits 310 by K.

[Equation 1]

$$Xave = \frac{1}{K}\sum_{p=1}^{K} X_p \tag{1}$$

Then, a total sum of K "squares of a difference between the degree of degradation Xp and the average degree of degradation Xave" is determined, and the square root of a value obtained by dividing the total sum by K is determined. That is, a standard deviation σ of the degrees of degradation X is calculated by the following equation (2):

[Equation 2]

$$\sigma = \sqrt{\frac{1}{K}\sum_{p=1}^{K}(X_p - Xave)^2} \tag{2}$$

Finally, as shown in the following equation (3), by dividing the standard deviation σ by the average degree of degradation Xave, a variation coefficient CV of the degrees of degradation X is calculated.

[Equation 3]

$$CV = \frac{\sigma}{Xave} \tag{3}$$

The variation coefficient CV calculated in the above-described manner is provided to the reference luminance setting circuit 140.

The reference luminance setting circuit 140 sets the above-described reference luminance SB based on the degrees of degradation X for one screen held in the frame memory 120 and the variation coefficient CV calculated by the variation coefficient calculating circuit 130. Note that a detailed description of the reference luminance setting circuit 140 will be made later.

The compensation computing circuit 150 performs a compensation computation process on input video signals (image data sent from an external source) VDb, based on the degree of degradation X of each pixel circuit 310 and the reference luminance SB set by the reference luminance setting circuit 140. By this, the input video signals VDb are corrected so as to compensate for degradation of pixels, and digital video signals VDa to be supplied to the N×M pixel circuits 310 in the display unit 30 are generated. As above, the compensation computing circuit 150 corrects input video signals VDb based on reference luminance SB and the degree of degradation X of each of the N×M pixel circuits 310 upon generating digital video signals VDa to be supplied to the N×M pixel circuits 310, thereby compensating for degradation of pixels (degradation of compensation-target circuit elements). Note that a further detailed description of processes performed by the compensation computing circuit 150 will be made later.

The data line driving unit 210 generates data voltages based on the digital video signals (image data having been subjected to the compensation computation process) VDa generated by the compensation computing circuit 150, and applies the data voltages to the data lines S.

Note that although, in the present embodiment, it is assumed that current values are obtained for all pixels (pixel circuits 310) by characteristic detection monitoring, the configuration is not limited thereto. By obtaining current values by characteristic detection monitoring, with a plurality of pixels serving as one unit, it becomes possible to reduce memory capacity for holding the degrees of degradation X. In this case, compensation accuracy decreases, but when a high-resolution panel whose pixel size is very small is adopted, it is difficult for a viewer to visually recognize a difference between an image having been subjected to a compensation process for a case in which current values are obtained for all pixels and an image having been subjected to a compensation process for a case in which current values are obtained with a plurality of pixels serving as one unit. Therefore, when a high-resolution panel is adopted, by obtaining current values by characteristic detection monitoring with a plurality of pixels serving as one unit, an effect of cost reduction is obtained.

As above, the degree-of-degradation calculating circuit 110 may calculate a degree of degradation X for all of the N×M pixel circuits 310, or may calculate a degree of degradation X for some of the N×M pixel circuits 310, with a plurality of pixel circuits 310 serving as one unit. Here, when it is assumed that K pixel circuits 310 are targets for calculation of the degree of degradation X by the degree-of-degradation calculating circuit 110, the variation coefficient calculating circuit 130, the reference luminance setting circuit 140, and the compensation computing circuit 150 perform the above-described processes based on the degrees of degradation X of the K pixel circuits 310.

<1.3.2 Characteristic Detection Monitoring>

Figure 6:
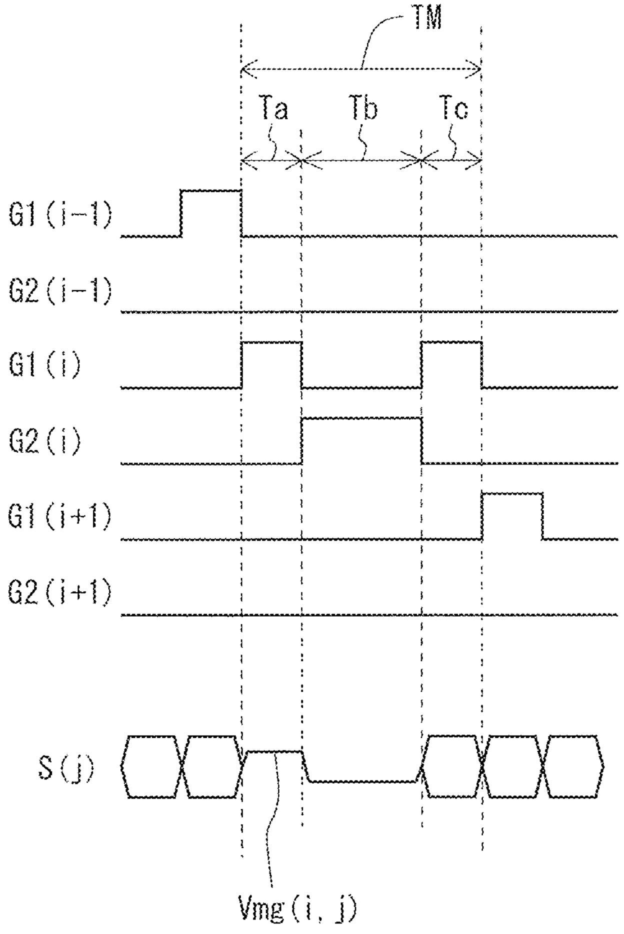
FIG. 6 is a timing chart for describing a driving method for performing characteristic detection monitoring in the first embodiment.

Next, characteristic detection monitoring will be described. FIG. 6 is a timing chart for describing a driving method for performing characteristic detection monitoring. Note that FIG. 6 shows an example in which characteristic detection monitoring is performed for an ith row. In FIG. 6, a period indicated by reference character TM is a characteristic detection period. The characteristic detection period TM includes a period during which preparation for detecting a TFT characteristic or an OLED characteristic in a monitoring row is performed (hereinafter, referred to as "detection preparation period".) Ta; a period during which current measurement for detecting a characteristic is performed (hereinafter, referred to as "current measurement period".) Tb; and a period during which writing of a video signal voltage (a data voltage corresponding to a normal display image) is performed in the monitoring row (hereinafter, referred to as "video signal voltage writing period".) Tc.

During the detection preparation period Ta, a scanning line G1(i) is brought into an active state, and a monitoring control line G2(i) is maintained in a non-active state. By this, the input transistor T1 goes into an on state, and the monitoring control transistor T3 is maintained in an off state. In addition, during the detection preparation period Ta, a monitoring voltage Vmg(i, j) is applied to a data line S(j). Note that the monitoring voltage Vmg(i, j) does not indicate a given fixed voltage, and the magnitude of the monitoring voltage Vmg(i, j) differs between when a TFT characteristic is detected and when an OLED characteristic is detected. That is, the monitoring voltage used here is a concept including both a monitoring voltage for detecting a TFT characteristic (hereinafter, referred to as "TFT characteristic measurement voltage".) and a monitoring voltage for detecting an OLED characteristic (hereinafter, referred to as "OLED characteristic measurement voltage".). When the monitoring voltage Vmg(i, j) is the TFT characteristic measurement voltage, the drive transistor T2 goes into an on state. When the monitoring voltage Vmg(i, j) is the OLED characteristic measurement voltage, the drive transistor T2 is maintained in an off state.

Figure 7:
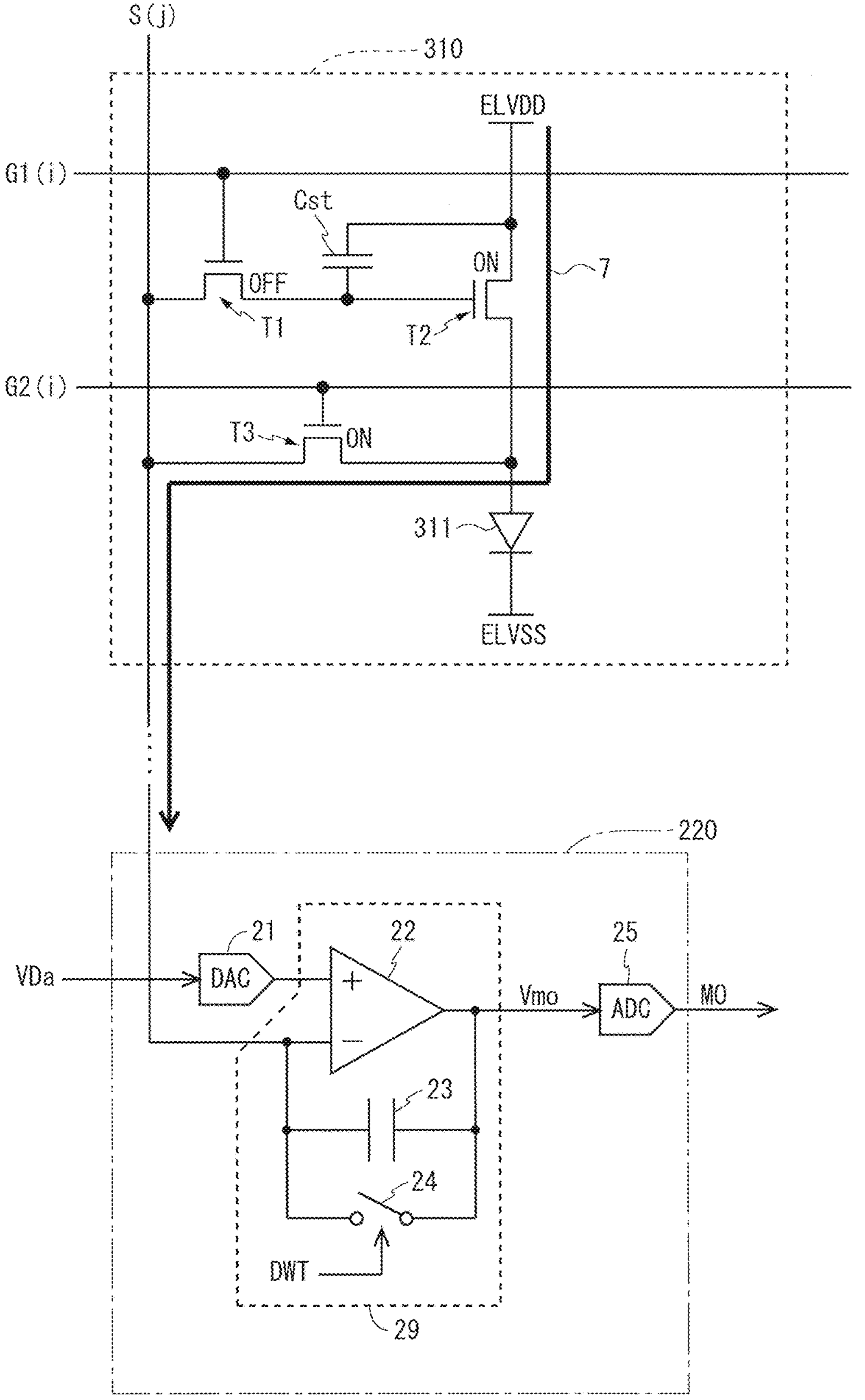
FIG. 7 is a diagram for describing the flow of current during a current measurement period when a characteristic of a drive transistor is detected in the first embodiment.
Figure 8:
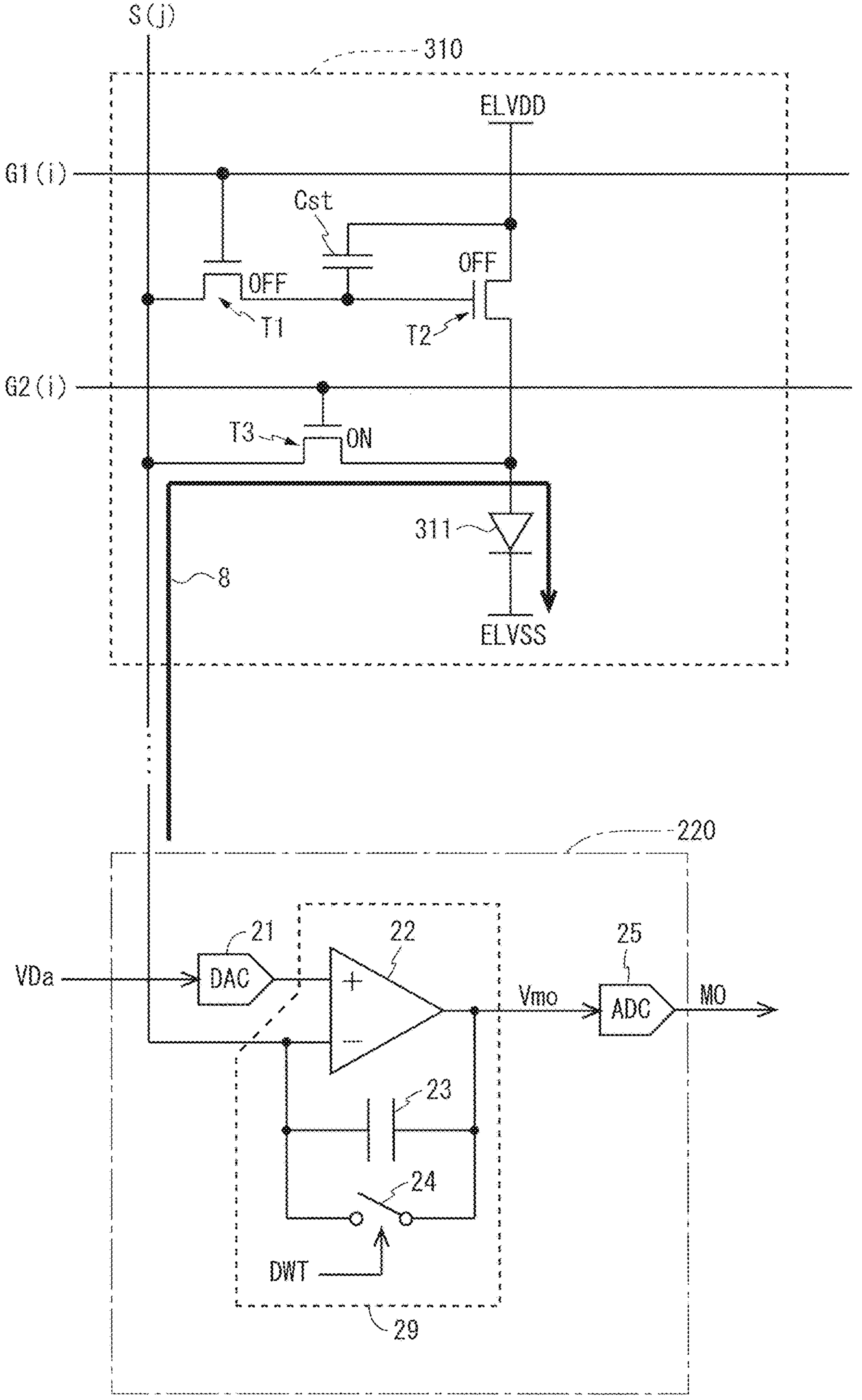
FIG. 8 is a diagram for describing the flow of current during a current measurement period when a characteristic of an organic EL element is detected in the first embodiment.

During the current measurement period Tb, the scanning line G1 (i) is brought into a non-active state and the monitoring control line G2(i) is brought into an active state. By this, the input transistor T1 goes into an off state and the monitoring control transistor T3 goes into an on state. Here, when the monitoring voltage Vmg(i, j) is the TFT characteristic measurement voltage, the drive transistor T2 is maintained in an on state and current does not flow through the organic EL element 311. Thus, as indicated by an arrow given reference character 7 in FIG. 7, current flowing through the drive transistor T2 is outputted to the data line S(j) through the monitoring control transistor T3. In this state, the current flowing through the data line S(j) is measured by the current monitoring unit 220 in the source driver 20. On the other hand, when the monitoring voltage Vmg(i, j) is the OLED characteristic measurement voltage, the drive transistor T2 is maintained in an off state and current flows through the organic EL element 311. That is, as indicated by an arrow given reference character 8 in FIG. 8, current flows through the organic EL element 311 from the data line S(j) through the monitoring control transistor T3. In this state, the current flowing through the data line S(j) is measured by the current monitoring unit 220 in the source driver 20.

Figure 9:
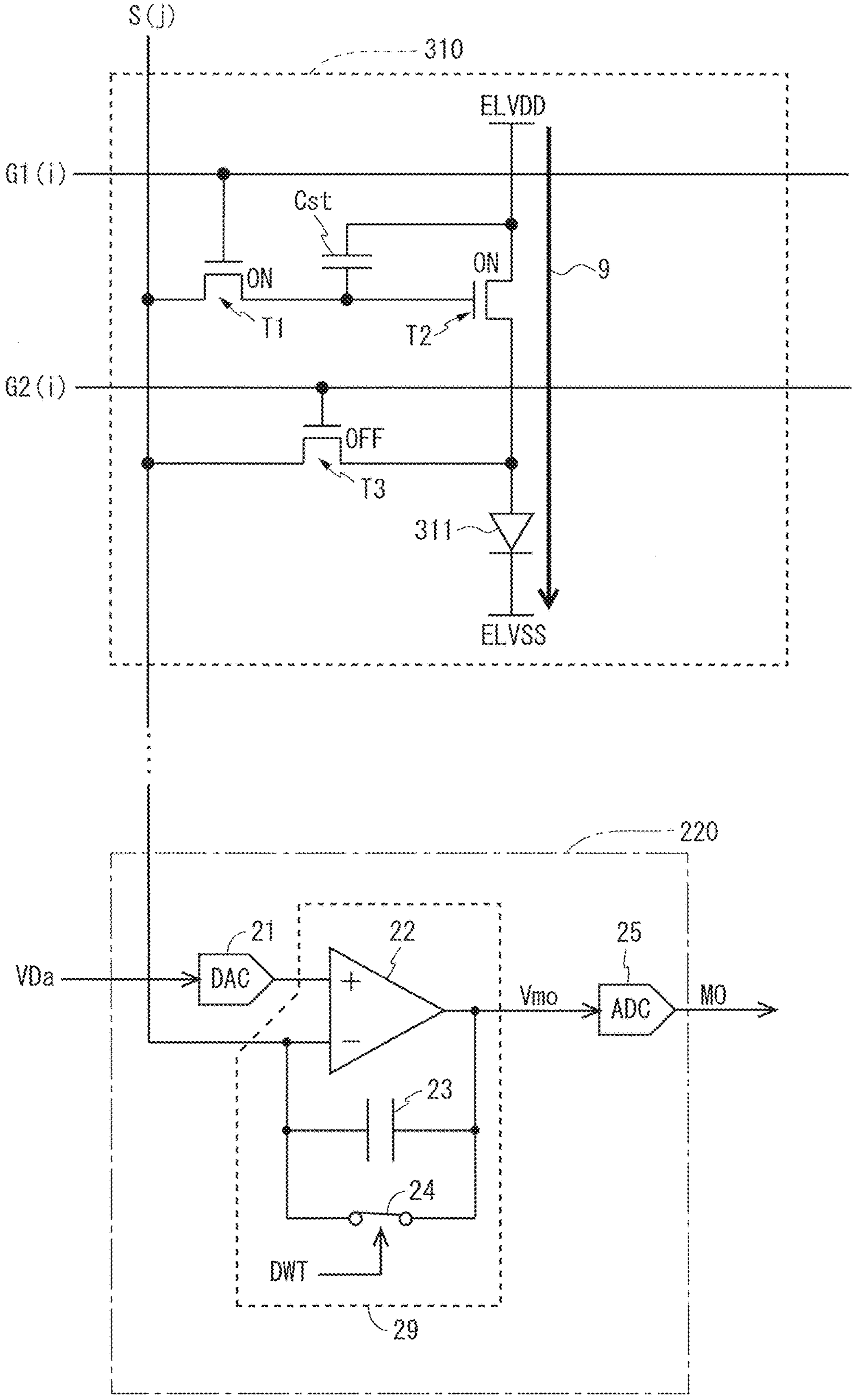
FIG. 9 is a diagram for describing the flow of current during a video signal voltage writing period in the first embodiment.

During the video signal voltage writing period Tc, the scanning line G1(i) is brought into an active state and the monitoring control line G2(i) is brought into a non-active state. By this, the input transistor T1 goes into an on state and the monitoring control transistor T3 goes into an off state. In addition, during the video signal voltage writing period Tc, a data voltage based on target luminance is applied to the data line S(j). By this, the drive transistor T2 goes into an on state. As a result, as indicated by an arrow given reference character 9 in FIG. 9, drive current is supplied to the organic EL element 311 through the drive transistor T2. By this, the organic EL element 311 emits light at luminance depending on the drive current.

<1.3.3 Setting of Reference Luminance>

Next, the setting of reference luminance (luminance used as a reference for determining display luminance of each organic EL element 311 after degradation compensation) will be described. The organic EL display device according to the present embodiment is characterized in that the way of setting reference luminance upon a compensation process varies depending on the magnitude of variations in the degree of degradation X, which will be described with reference to FIGS. 10 to 15. Note that for FIGS. 10 and 11, a dotted line given reference character 50 indicates an initial degree of degradation, a dotted line given reference character 51 indicates an average degree of degradation, and a dotted line given reference character 52 indicates a degree of degradation greater than the average degree of degradation.

Figure 10:
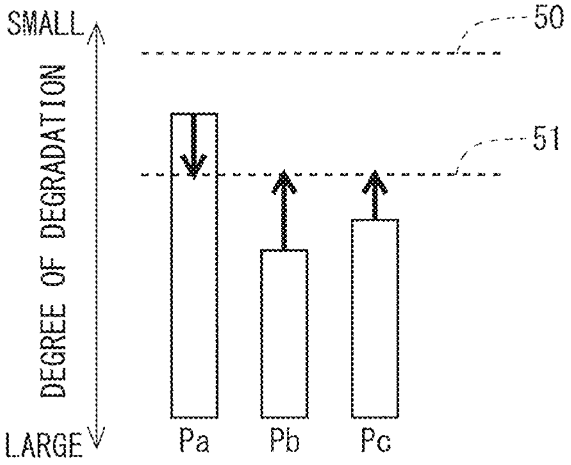
FIG. 10 is a diagram for describing the setting of reference luminance when variations in the degree of degradation are small in the first embodiment.
Figure 11:
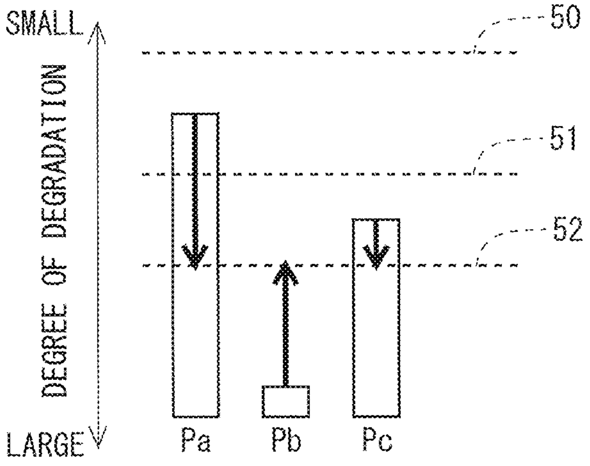
FIG. 11 is a diagram for describing the setting of reference luminance when variations in the degree of degradation are large in the first embodiment.

In the present embodiment, when variations in the degree of degradation X are relatively small, compensation is performed with reference to a luminance level corresponding to an average degree of degradation of all pixels as shown in FIG. 10. On the other hand, when variations in the degree of degradation X are relatively large, compensation is performed with reference to a luminance level corresponding to a degree of degradation greater than the average degree of degradation of all pixels as shown in FIG. 11. Variations in the degree of degradation X are determined by the magnitude of a variation coefficient CV of the degrees of degradation X. Specifically, a threshold value is prepared in advance, and when the variation coefficient CV is less than or equal to the threshold value, compensation is performed with reference to a luminance level corresponding to an average degree of degradation of all pixels, and when the variation coefficient CV is greater than the threshold value, compensation is performed with reference to a luminance level corresponding to a degree of degradation greater than the average degree of degradation of all pixels. In other words, when the variation coefficient CV is less than or equal to the threshold value, the reference luminance is set to average luminance for a case in which all organic EL elements 311 emit light based on a predetermined gradation value in a state in which degradation compensation is not performed (hereinafter, referred to as "pre-compensation average luminance".), and when the variation coefficient CV is greater than the threshold value, the reference luminance is set to luminance lower than the above-described pre-compensation average luminance.

Note that as described above, the degree-of-degradation calculating circuit 110 may calculate a degree of degradation X for some of the N×M pixel circuits 310.

In this case, the above-described pre-compensation average luminance is average luminance for a case in which organic EL elements 311 included in some of the N×M pixel circuits 310 emit light based on a predetermined gradation value in a state in which degradation compensation is not performed. From the above, when it is assumed that K pixel circuits 310 are targets for calculation of a degree of degradation X, if the variation coefficient CV is less than or equal to the threshold value, then the reference luminance is set to average luminance (pre-compensation average luminance) of K organic EL elements 311 included in the K pixel circuits 310 for a case in which the K organic EL elements 311 emit light based on a predetermined gradation value in a state in which degradation compensation is not performed, and if the variation coefficient CV is greater than the threshold value, then the reference luminance is set to luminance lower than the pre-compensation average luminance.

The setting of the reference luminance is performed, for example, such that a correspondence between the variation coefficient and the reference luminance satisfies a correspondence represented by a bold solid line of FIG. 12. Note that for FIG. 12, a dotted line given reference character 55 indicates pre-compensation average luminance. In an example shown in FIG. 12, the threshold value is 0.2. Thus, when the variation coefficient CV is 0.2 or less, the reference luminance is set to the pre-compensation average luminance, and when the variation coefficient CV is greater than 0.2, the reference luminance is set to luminance lower than the pre-compensation average luminance. Regarding this, when the variation coefficient CV exceeds 0.2, the reference luminance decreases as the variation coefficient CV increases as indicated by a portion given reference character 56 in FIG. 12.

Figure 15:
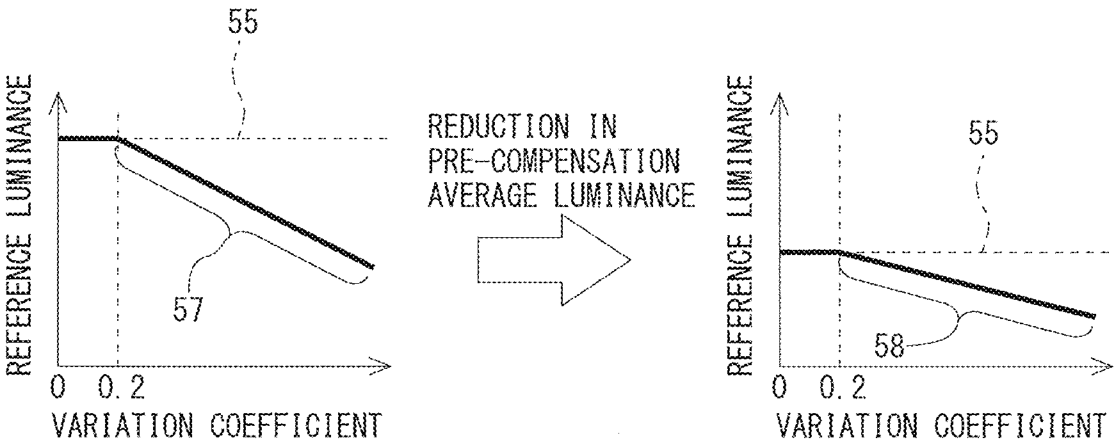
FIG. 15 is a diagram for describing a change in the relationship between the variation coefficient and the reference luminance in the first embodiment.

Meanwhile, the pre-compensation average luminance changes over time. Therefore, in order to calculate the reference luminance, there is a need to hold information indicating a correspondence such as that shown in FIG. 12, for each value in a minimum unit of the pre-compensation average luminance. However, providing a memory, etc., for holding such information causes a cost increase. Hence, in the present embodiment, a configuration is adopted in which the reference luminance is calculated by multiplying the pre-compensation average luminance by an adjustment factor determined based on a "graph representing a correspondence between the variation coefficient and the adjustment factor" such as that shown in FIG. 13. Regarding this, a graph such as that shown in FIG. 13 can be reproduced if there are information on a critical point on a graph and information on a slope between the critical points. When the adjustment factor for a case in which the variation coefficient is "0" is determined to be 1.0, if there is information such as that shown in FIG. 14, then the graph shown in FIG. 13 can be reproduced. Thus, in the present embodiment, information such as that shown in FIG. 14 (information on a critical point on a graph and information on a slope between the critical points) is held in, for example, a register. According to the above-described technique, as shown in FIG. 15, when the pre-compensation average luminance is reduced, the slope of a "line representing a correspondence between the variation coefficient and the reference luminance" of a portion in which the variation coefficient is greater than the threshold value becomes gentle (the slope of a line of a portion given reference character 58 is more gentle than the slope of a line of a portion given reference character 57).

Figure 16:
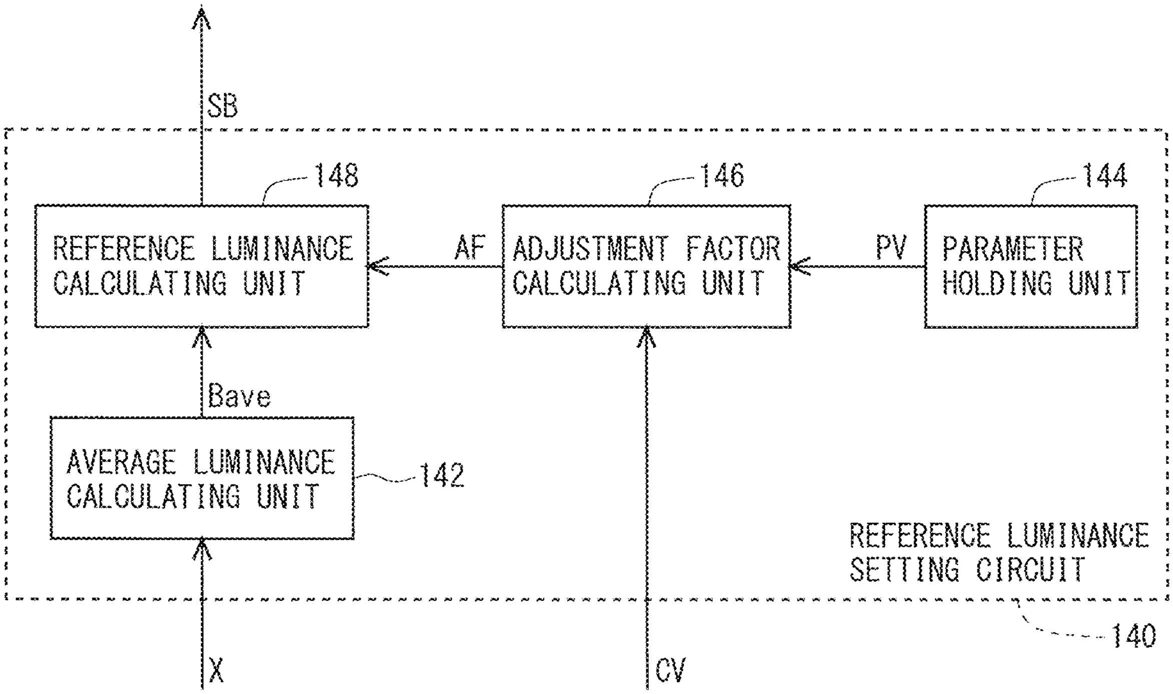
FIG. 16 is a block diagram showing a detailed configuration of a reference luminance setting circuit in the first embodiment.

FIG. 16 is a block diagram showing a detailed configuration of the reference luminance setting circuit 140 for setting the reference luminance in the above-described manner. As shown in FIG. 16, the reference luminance setting circuit 140 is composed of an average luminance calculating unit 142, a parameter holding unit 144, an adjustment factor calculating unit 146, and a reference luminance calculating unit 148.

The average luminance calculating unit 142 calculates the above-described pre-compensation average luminance Bave, based on the degrees of degradation X for one screen held in the frame memory 120. For the calculation, first, a degree of degradation X of each pixel circuit 310 (e.g., the amount of change in threshold voltage from an initial state) is read from the frame memory 120. Then, an I-V characteristic (current-voltage characteristic) of the drive transistor T2 in each pixel circuit 310 is determined from the read degree of degradation X. For example, in a case in which the amount of change in threshold voltage from an initial state is treated as the degree of degradation X, the I-V characteristic is obtained by shifting an I-V characteristic in an initial state based on the amount of change in threshold voltage. When the light-emission efficiency of the organic EL element 311 has not been reduced, display luminance is proportional to the amount of current, and thus, a luminance-voltage characteristic (a relationship between a voltage applied to the control terminal of the drive transistor T2 and display luminance) of each pixel circuit 310 is obtained based on an I-V characteristic of the drive transistor T2 in each pixel circuit 310 and a relationship between the amount of current and display luminance of the organic EL element 311. Furthermore, display luminance of each pixel when a voltage corresponding to a predetermined gradation value is provided to the control terminal of the drive transistor T2 in each pixel circuit 310 (i.e., display luminance of each pixel for a case in which the organic EL element 311 included in each pixel circuit 310 emits light based on a predetermined gradation value in a state in which degradation compensation is not performed) is calculated from the luminance-voltage characteristic of each pixel circuit 310. Then, by dividing a total sum of the display luminance of all pixels by the number of pixels (the number of the pixel circuits 310), pre-compensation average luminance Bave is calculated. Note that display luminance for a case in which the light-emission efficiency of the organic EL element 311 has been reduced is obtained by multiplying display luminance for a case in which the light-emission efficiency of the organic EL element 311 has not been reduced by reduced light-emission efficiency (a value less than 1) which is estimated from the degree of degradation X. Thus, when the light-emission efficiency of the organic EL element 311 has been reduced, a luminance-voltage characteristic of each pixel circuit 310 is obtained based on an I-V characteristic of the drive transistor T2 in each pixel circuit 310 and a "relationship between the amount of current and display luminance of the organic EL element 311" that takes into account a reduction in light-emission efficiency.

The parameter holding unit 144 is, for example, a register and holds parameters PV for determining an adjustment factor AF based on the variation coefficient CV of the degrees of degradation X. More specifically, in order that a graph whose horizontal axis is a value that the variation coefficient CV can take and whose vertical axis is a value that the adjustment factor AF for calculating reference luminance can take (a graph representing a correspondence between the variation coefficient CV and the adjustment factor AF) (see FIG. 13) can be obtained, the parameter holding unit 144 holds, as parameters PV, a value, on the horizontal axis, of a critical point on the graph and a slope between adjacent critical points on the graph (see FIG. 14).

The adjustment factor calculating unit 146 calculates an adjustment factor AF based on the variation coefficient CV of the degrees of degradation X by referring to the parameters PV held in the parameter holding unit 144.

In a case shown in FIGS. 13 and 14, for example, when the variation coefficient CV is 0.1, the adjustment factor is 1.0, and when the variation coefficient CV is 0.4, the adjustment factor is 0.9, and when the variation coefficient CV is 1.2, the adjustment factor is 0.5.

The reference luminance calculating unit 148 calculates reference luminance SB by multiplying the pre-compensation average luminance Bave calculated by the average luminance calculating unit 142 by the adjustment factor AF calculated by the adjustment factor calculating unit 146.

Based on the reference luminance SB set in the above-described manner, a compensation computation process by the compensation computing circuit 150 is performed. By this, degradation of pixels (degradation of compensation-target circuit elements) is compensated for.

<1.3.4 Processes Performed by the Compensation Computing Circuit>

Processes performed by the compensation computing circuit 150 (see FIG. 4) will be described in detail. As described above, the compensation computing circuit 150 generates digital video signals VDa by performing a compensation computation process on input video signals (image data sent from an external source) VDb. Regarding this, the value of an input video signal VDb corresponds to a gradation value, and the value of a digital video signal VDa is a value depending on a voltage (gate voltage) to be applied to the control terminal of the drive transistor T2. That is, the compensation computing circuit 150 performs, as a compensation computation process, a process of determining a gate voltage from a gradation value. A process of determining a gate voltage from a gradation value will be described below, taking a look at one pixel circuit 310.

First, target luminance corresponding to a gradation value indicated by an input video signal VDb is determined. The target luminance is luminance indicating at what level of brightness the organic EL element 311 is to emit light so that degradation compensation is performed, and is luminance determined for each organic EL element 311. For example, the target luminance differs between an organic EL element 311 that is to emit light (display) based on the gradation value "30" and an organic EL element 311 that is to emit light (display) based on the gradation value "100". Target luminance Lx is determined by the following equation (4):

$$Lx=SB\times(Gx/Gm)^{\gamma} \quad (4)$$

For the above equation (4), SB represents reference luminance set by the reference luminance setting circuit 140, Gx represents a gradation value indicated by an input video signal VDb, Gm represents a predetermined gradation value used upon calculation of pre-compensation average luminance Bave by the average luminance calculating unit 142, and γ represents a gamma value that defines a relationship between the gradation value and luminance in the organic EL display device.

Next, the magnitude of current (the amount of current) to be supplied to the organic EL element 311 is determined. For the determination, first, a relationship between the amount of current and display luminance of the organic EL element 311 is determined taking into account a reduction in light-emission efficiency which is estimated from the degree of degradation X read from the frame memory 120. Then, based on the relationship, the magnitude of current (the amount of current) to be supplied to the organic EL element 311 is determined from the target luminance Lx determined by the above equation (4).

Thereafter, a gate voltage corresponding to the magnitude of current (the amount of current) to be supplied to the organic EL element 311 is determined based on an I-V characteristic of the drive transistor T2 obtained after degradation (which is obtained by shifting an I-V characteristic in an initial state depending on the degree of degradation X).

<1.4 Effects>

According to the present embodiment, a variation coefficient CV of the degrees of degradation X of compensation-target circuit elements is calculated, and reference luminance (luminance used as a reference for determining display luminance of each organic EL element 311 after degradation compensation) SB is set based on the variation coefficient CV. When the variation coefficient CV is less than or equal to a threshold value which is prepared in advance, i.e., when variations in the degree of degradation X are relatively small, the reference luminance SB is set to pre-compensation average luminance Bave. In this case, the magnitude of compensation current is relatively small, and thus, speeding-up of degradation of pixels (degradation of compensation-target circuit elements) is suppressed. In addition, a remarkable darkening of display is also suppressed. When the variation coefficient CV is greater than the threshold value, i.e., when variations in the degree of degradation X are relatively large, the reference luminance SB is set to luminance lower than the pre-compensation average luminance Bave. In this case, even if there is a remarkably degraded pixel compared to other pixels, since supply of large compensation current to the remarkably degraded pixel is suppressed, speeding-up of degradation of the pixel is suppressed. As such, not only when variations in the degree of degradation X are small, but also when variations in the degree of degradation X are large, speeding-up of degradation of pixels is suppressed. From the above, according to the present embodiment, an organic EL display device implements a compensation process that obtains a sufficient length of a compensable period. That is, in the organic EL display device, while uniformity of luminance on the entire screen is secured, rapid degradation of pixels is suppressed over known display devices.

In addition, in the present embodiment, the reference luminance SB is set based on the variation coefficient CV of the degrees of degradation X as described above. Since the variation coefficient CV is a dimensionless numerical value, by using the variation coefficient CV, relative evaluation of variations in the degree of degradation X can be performed regardless of the magnitude of a numerical value indicating the degree of degradation X. Therefore, for example, it becomes unnecessary to perform the operation of adjusting a threshold value for each device or for each model, etc.

<1.5 Variants>

<1.5.1 First Variant>

In the first embodiment, the setting of reference luminance SB by the reference luminance setting circuit 140 is performed based on a variation coefficient CV of the degrees of degradation X. However, the configuration is not limited thereto. For example, the setting of reference luminance SB may be performed based on the standard deviation or variance of the degrees of degradation X or may be performed based on the maximum deviation of the degrees of degradation X (a difference between a maximum degree of degradation and a minimum degree of degradation). That is, the configuration may be such that an index value calculating circuit (in the first embodiment, the variation coefficient calculating circuit 130) is provided that calculates, as an index value, a value depending on a deviation determined based on the degrees of degradation X of some or all of the N×M pixel circuits 310, and the setting of reference luminance SB by the reference luminance setting circuit 140 is performed based on the index value calculated by the index value calculating circuit.

<1.5.2 Second Variant>

Figure 17:
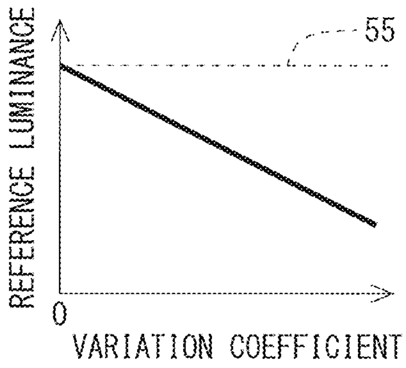
FIG. 17 is a diagram showing a relationship between a variation coefficient and reference luminance in a second variant of the first embodiment.

In the first embodiment, when the variation coefficient CV is less than or equal to the threshold value, the reference luminance SB is set to the pre-compensation average luminance Bave, and when the variation coefficient CV is greater than the threshold value, the reference luminance SB is set to luminance lower than the pre-compensation average luminance Bave (see FIG. 12). However, the configuration is not limited thereto. The reference luminance SB may be set to a smaller value as the variation coefficient CV increases without comparing the variation coefficient CV with the threshold value. In this case, the reference luminance SB is set such that a correspondence between the variation coefficient CV and the reference luminance SB satisfies a correspondence such as that represented by, for example, a bold solid line of FIG. 17.

<1.5.3 Third Variant>

Figure 18:
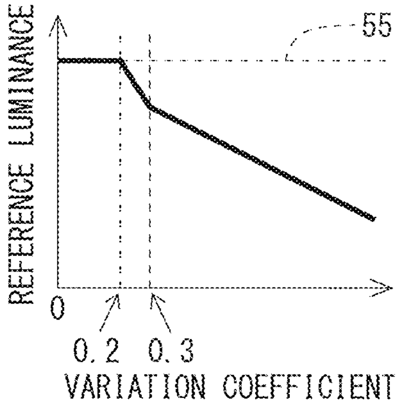
FIG. 18 is a diagram showing a relationship between a variation coefficient and reference luminance in a third variant of the first embodiment.

In the first embodiment, there is provided only one threshold value to be compared with the variation coefficient CV upon setting the reference luminance SB. However, the configuration is not limited thereto, and two or more threshold values may be provided. By this, for example, as shown in FIG. 18, the degree of reduction in the reference luminance SB can be made mild as the variation coefficient CV increases (variations in the degree of degradation X increase). According to such a technique, the influence of a small number of remarkably degraded pixels can be mitigated.

2. Second Embodiment

A second embodiment will be described. The following mainly describes only differences from the first embodiment.

<2.1 Overall Configuration, etc.>

Figure 19:
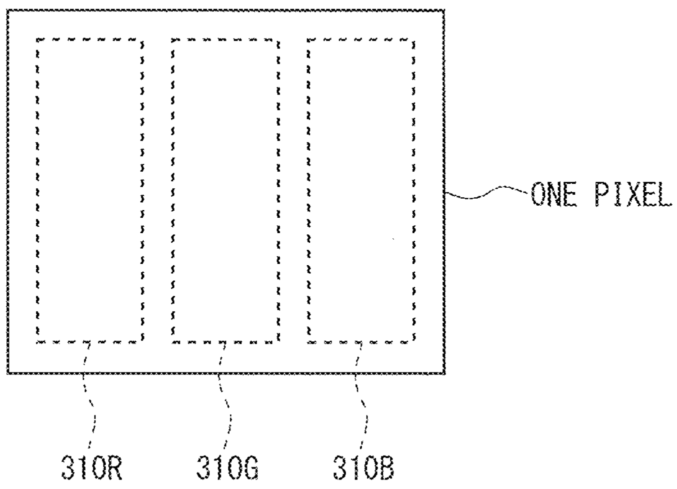
FIG. 19 is a diagram for describing a configuration of a pixel of a second embodiment.

An overall configuration in the present embodiment is the same as the overall configuration in the first embodiment (see FIG. 1). Note, however, that an organic EL display device according to the present embodiment is a display device that performs color display. Thus, as shown in FIG. 19, one pixel is composed of a pixel circuit 310R for red, a pixel circuit 310G for green, and a pixel circuit 310B for blue. Note that pixel circuits for other colors than these three colors may be included. An organic EL element 311 in the pixel circuit 310R emits red light, an organic EL element 311 in the pixel circuit 310G emits green light, and an organic EL element 311 in the pixel circuit 310B emits blue light.

<2.2 Compensation Process>

A compensation process of the present embodiment will be described below.

<2.2.1 Outline>

Figure 20:
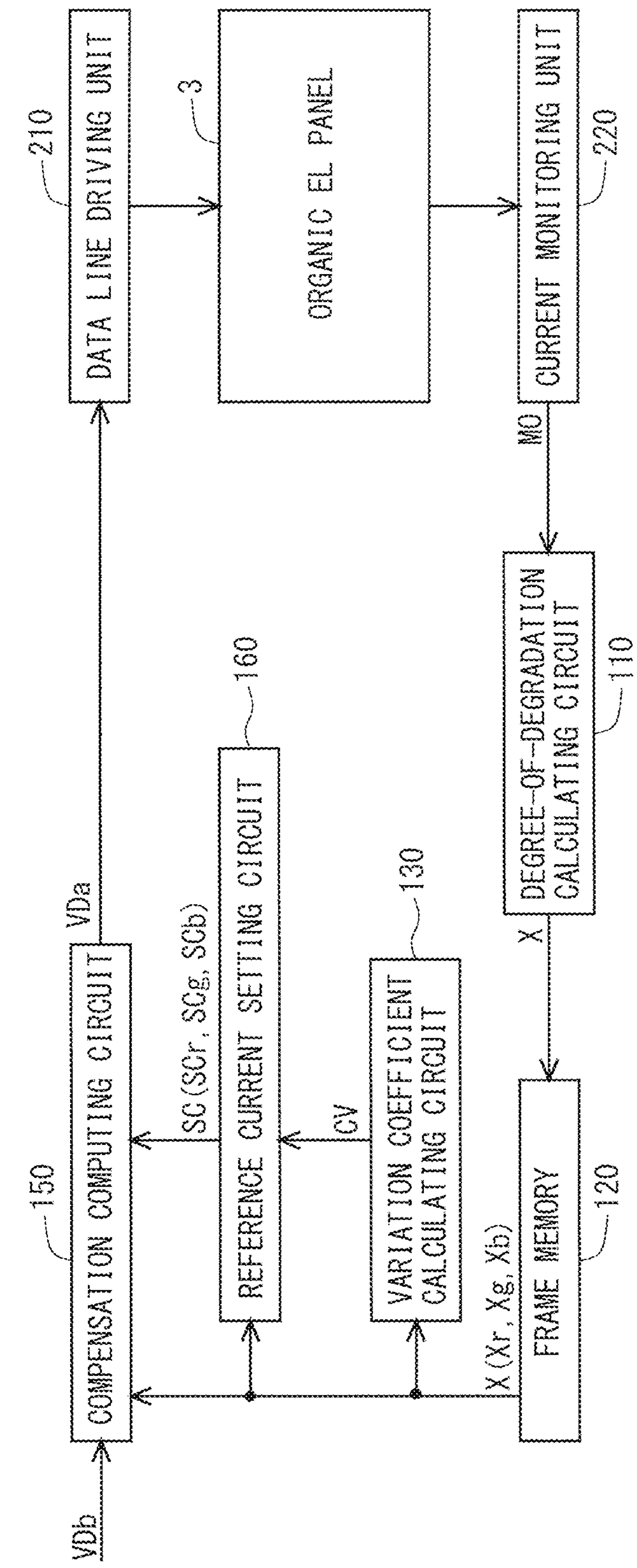
FIG. 20 is a block diagram for describing a schematic configuration for a compensation process in the second embodiment.

FIG. 20 is a block diagram for describing a schematic configuration for a compensation process. In the present embodiment, instead of the reference luminance setting circuit 140 of the first embodiment, a reference current setting circuit 160 is provided. The data line driving unit 210, the current monitoring unit 220, the degree-of-degradation calculating circuit 110, the frame memory 120, and the variation coefficient calculating circuit 130 are the same as those of the first embodiment. Note, however, that in FIG. 20, for the degree of degradation X, the degree of degradation of a pixel for red is represented by Xr, the degree of degradation of a pixel for green is represented by Xg, and the degree of degradation of a pixel for blue is represented by Xb.

The reference current setting circuit 160 sets reference current SC corresponding to reference luminance (luminance used as a reference for determining display luminance of each organic EL element 311 after degradation compensation), based on the degrees of degradation X (Xr, Xg, and Xb) for one screen held in the frame memory 120 and a variation coefficient CV calculated by the variation coefficient calculating circuit 130. Note that the reference current for the pixel circuit 310R for red is represented by SCr, the reference current for the pixel circuit 310G for green is represented by SCg, and the reference current for the pixel circuit 310B for blue is represented by SCb.

The compensation computing circuit 150 performs a compensation computation process on an input video signal (image data sent from an external source) VDb, based on the degrees of degradation X of each pixel circuit 310 and the reference currents SC set by the reference current setting circuit 160. By this, the input video signals VDb are corrected so as to compensate for degradation of pixels, and digital video signals VDa to be supplied to the N×M pixel circuits 310 in the display unit 30 are generated. As above, the compensation computing circuit 150 corrects an input video signal VDb based on reference currents SC and the degrees of degradation X of each of the N×M pixel circuits 310 upon generating digital video signals VDa to be supplied to the N×M pixel circuits 310, thereby compensating for degradation of pixels (degradation of compensation-target circuit elements). Note that a further detailed description of processes performed by the compensation computing circuit 150 will be made later.

As described above, in the present embodiment, unlike the first embodiment, reference currents SC are set based on the variation coefficient CV of the degrees of degradation X, and a compensation computation process is performed based on the reference currents SC and the degrees of degradation X of each pixel circuit 310.

Note that in the present embodiment, too, the degrees of degradation X calculated by the degree-of-degradation calculating circuit 110 may be the degrees of degradation X of some of the N×M pixel circuits 310. Accordingly, processes by the variation coefficient calculating circuit 130, the reference current setting circuit 160, and the compensation computing circuit 150 may be performed based on the degrees of degradation X of some of the N×M pixel circuits 310.

Meanwhile, since one pixel is composed of a pixel circuit 310R for red, a pixel circuit 310G for green, and a pixel circuit 310B for blue as described above, for the degree of degradation X, too, the degree of degradation Xr for red, the degree of degradation Xg for green, and the degree of degradation Xb for blue are determined. However, it is conceivable that if reference luminance is set for each color based on those degrees of degradation Xr, Xg, and Xb and a compensation process is performed based on the reference luminance, then white balance gets thrown off. For example, when reference luminance for blue is set to a value higher than that of reference luminance for red and green, an image with an overall bluish cast is displayed. Hence, the variation coefficient calculating circuit 130 calculates a variation coefficient CV common to all colors, based on the degrees of degradation X for all colors (the degree of degradation Xr of the pixel circuit 310R for red, the degree of degradation Xg of the pixel circuit 310G for green, and the degree of degradation Xb of the pixel circuit 310B for blue). The reference current setting circuit 160 first calculates base reference current used as a base for calculating reference current for each color, based on the variation coefficient CV common to all colors which is calculated by the variation coefficient calculating circuit 130. Then, based on the base reference current, the reference current setting circuit 160 sets, for each color, the reference current according to light-emission efficiency. That is, the reference current setting circuit 160 sets the reference current SCr for red, the reference current SCg for green, and the reference current SCb for blue.

Figure 21:
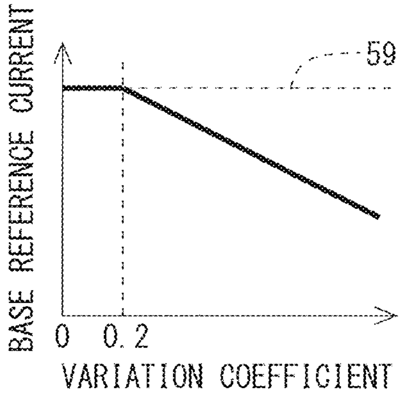
FIG. 21 is a diagram showing a relationship between a variation coefficient and base reference current in the second embodiment.

In the present embodiment, for example, as shown in FIG. 21, when the variation coefficient CV is less than or equal to a threshold value which is prepared in advance (i.e., when variations in the degree of degradation X are relatively small), the base reference current is set to average current corresponding to the above-described pre-compensation average luminance Bave (hereinafter, referred to as "pre-compensation average current".) (a dotted line given reference character 59 in FIG. 21 indicates the pre-compensation average current), and when the variation coefficient CV is greater than the threshold value (i.e., when variations in the degree of degradation X are relatively large), the base reference current is set to current smaller than the pre-compensation average current. Note that the base reference current may be set in the same manner as in the second variant or the third variant of the first embodiment.

<2.2.2 Reference Current Setting Circuit>

Figure 22:
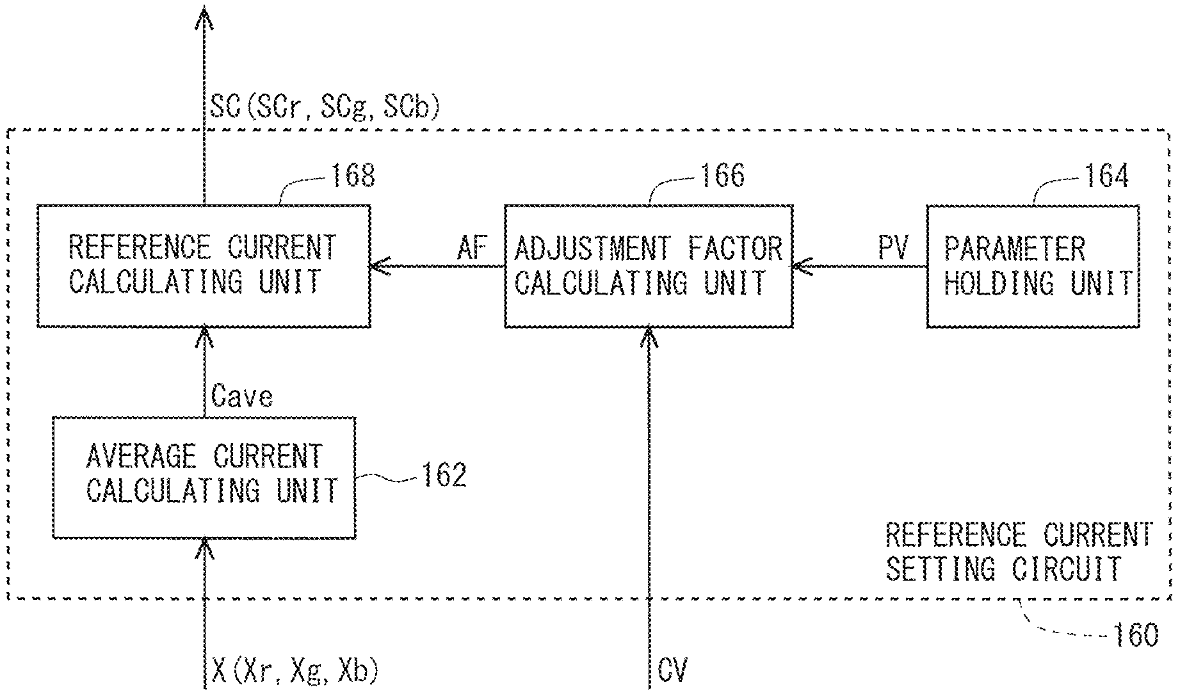
FIG. 22 is a block diagram showing a detailed configuration of a reference current setting circuit in the second embodiment.

FIG. 22 is a block diagram showing a detailed configuration of the reference current setting circuit 160. As shown in FIG. 22, the reference current setting circuit 160 is composed of an average current calculating unit 162, a parameter holding unit 164, an adjustment factor calculating unit 166, and a reference current calculating unit 168.

The average current calculating unit 162 calculates the pre-compensation average current Cave based on the degrees of degradation X for one screen held in the frame memory 120. For the calculation, first, pre-compensation average luminance Bave is calculated in the same manner as in the first embodiment. Then, the pre-compensation average current Cave is determined from the pre-compensation average luminance Bave, based on a relationship between the amount of current and display luminance of the organic EL element 311.

As in the first embodiment, the parameter holding unit 164 holds, as parameters PV, a value, on the horizontal axis, of a critical point on a graph for determining an adjustment factor AF (see FIG. 13) and a slope between adjacent critical points on the graph. As in the first embodiment, the adjustment factor calculating unit 166 calculates an adjustment factor AF based on the variation coefficient CV of the degrees of degradation X by referring to the parameters PV held in the parameter holding unit 164.

The reference current calculating unit 168 calculates the above-described base reference current by multiplying the pre-compensation average current Cave calculated by the average current calculating unit 162 by the adjustment factor AF calculated by the adjustment factor calculating unit 166. Based on the base reference current, the reference current calculating unit 168 calculates the reference current SC for each color, taking into account light-emission efficiency for each of red, green, and blue. That is, the reference current SCr for red, the reference current SCg for green, and the reference current SCb for blue are calculated by the reference current calculating unit 168.

Based on the reference currents SCr, SCg, and SCb for the respective colors set in the above-described manner, a compensation computation process by the compensation computing circuit 150 is performed. By this, degradation of pixels (degradation of compensation-target circuit elements) are compensated for.

<2.2.3 Processes Performed by the Compensation Computing Circuit>

Processes performed by the compensation computing circuit 150 (see FIG. 20) will be described in detail. As in the first embodiment, the compensation computing circuit 150 performs, as a compensation computation process, a process of determining a gate voltage from a gradation value. A process of determining a gate voltage from a gradation value will be described below, taking a look at one pixel circuit 310R for red.

First, target current corresponding to a gradation value indicated by an input video signal VDb is determined. The target current is current to be supplied to an organic EL element 311 whose light-emission efficiency has not been reduced, so that the organic EL element 311 emits light at the above-described target luminance (luminance that indicates at what level of brightness the organic EL element 311 is to emit light so that degradation compensation is performed, and that is determined for each organic EL element 311). The target current Cx is determined by the following equation (5):

$$Cx=SCr\times(Gx/Gm)^{\gamma} \tag{5}$$

For the above equation (5), SCr represents the reference current (the reference current for red) set by the reference current setting circuit 160, Gx represents a gradation value indicated by an input video signal VDb, Gm represents a predetermined gradation value used upon calculation of a pre-compensation average current Cave by the average current calculating unit 162, and y represents a gamma value that defines a relationship between the gradation value and luminance of the organic EL display device.

Then, taking into account a reduction in light-emission efficiency which is estimated from a degree of degradation X read from the frame memory 120, the magnitude of current (the amount of current) to be actually supplied to the organic EL element 311 is determined from the target current Cx determined by the above equation (5).

Thereafter, a gate voltage corresponding to the magnitude of current (the amount of current) to be actually supplied to the organic EL element 311 is determined based on an I-V characteristic of the drive transistor T2 obtained after degradation (which is obtained by shifting an I-V characteristic in an initial state based on the degree of degradation X).

The same processes are also performed for data on the pixel circuit 310G for green and the pixel circuit 310B for blue.

<2.3 Effects>

According to the present embodiment, a variation coefficient CV of the degrees of degradation X of compensation-target circuit elements is calculated, and the base reference current is calculated based on the variation coefficient CV. Then, based on the base reference current, the reference current SC is set for each color, taking into account light-emission efficiency for each color. When the variation coefficient CV is less than or equal to a threshold value which is prepared in advance, i.e., when variations in the degree of degradation X are relatively small, the base reference current is set to the pre-compensation average current Cave. In this case, the magnitude of the compensation current is relatively small, and thus, speeding-up of degradation of pixels (degradation of compensation-target circuit elements) is suppressed. In addition, a remarkable darkening of display is also suppressed. When the variation coefficient CV is greater than the threshold value, i.e., when variations in the degree of degradation X are relatively large, the base reference current is set to current smaller than the pre-compensation average current Cave. In this case, even if there is a remarkably degraded pixel compared to other pixels, since supply of large compensation current to the remarkably degraded pixel is suppressed, speeding-up of degradation of the pixel is suppressed. As such, not only when variations in the degree of degradation X are small, but also when variations in the degree of degradation X are large, speeding-up of degradation of pixels is suppressed. From the above, according to the present embodiment, an organic EL display device that performs color display implements a compensation process that obtains a sufficient length of a compensable period. In addition, since the reference current SC is set for each color taking into account light-emission efficiency, white balance does not get thrown off by a compensation process.

<2.4 Variant>

In the second embodiment, a variation coefficient CV common to all colors is calculated based on the degrees of degradation X for all colors (the degree of degradation Xr of the pixel circuit 310R for red, the degree of degradation Xg of the pixel circuit 310G for green, and the degree of degradation Xb of the pixel circuit 310B for blue). However, the configuration is not limited thereto, and a variation coefficient CV common to all colors may be calculated based on the degree of degradation for green (the degree of degradation of the pixel circuit 310G for green) Xg, which will be described below as a variant of the second embodiment.

For the organic EL element 311 in the pixel circuit 310, generally, phosphorescent materials are adopted as light-emitting materials for red and green, and fluorescent materials are adopted as light-emitting materials for blue. The light-emission efficiency of phosphorescent materials is three times or more higher than the light-emission efficiency of fluorescent materials, but the phosphorescent materials are generally very low in thermal stability. In addition, green has a shorter wavelength than red and thus is energetically unstable. Therefore, an organic EL element that emits green light consequently degrades earlier than an organic EL element that emits blue light or an organic EL element that emits red light. Hence, in the present variant, a variation coefficient CV common to all colors is calculated based on the degree of degradation Xg for green.

Figure 23:
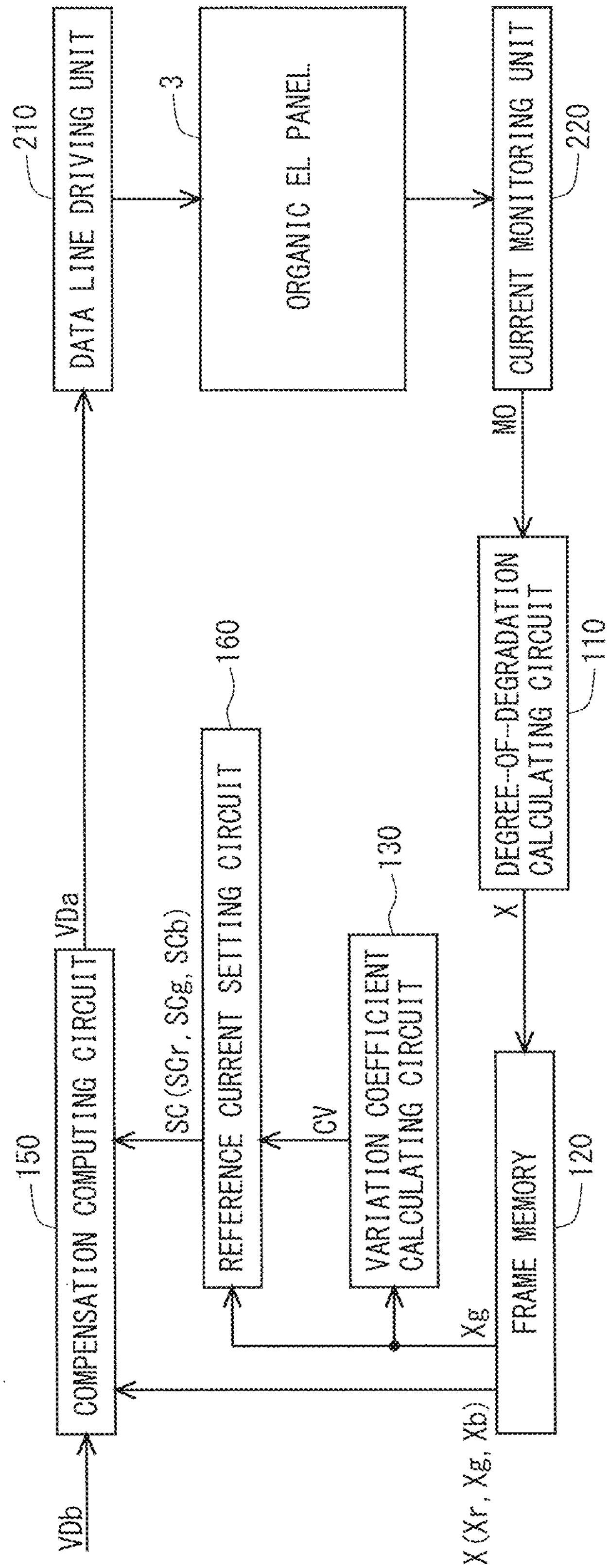
FIG. 23 is a block diagram for describing a schematic configuration for a compensation process in a variant of the second embodiment.

FIG. 23 is a block diagram for describing a schematic configuration for a compensation process. In the present variant, the variation coefficient calculating circuit 130 calculates a variation coefficient CV common to all colors, based on the degree of degradation Xg for green among the degrees of degradation X for one screen held in the frame memory 120. The reference current setting circuit 160 sets reference currents SC corresponding to reference luminance, based on the degree of degradation Xg for green among the degrees of degradation X for one screen held in the frame memory 120 and the variation coefficient CV calculated by the variation coefficient calculating circuit 130. Operation of the data line driving unit 210, the current monitoring unit 220, the degree-of-degradation calculating circuit 110, the frame memory 120, and the compensation computing circuit 150 is the same as that in the second embodiment.

Figure 24:
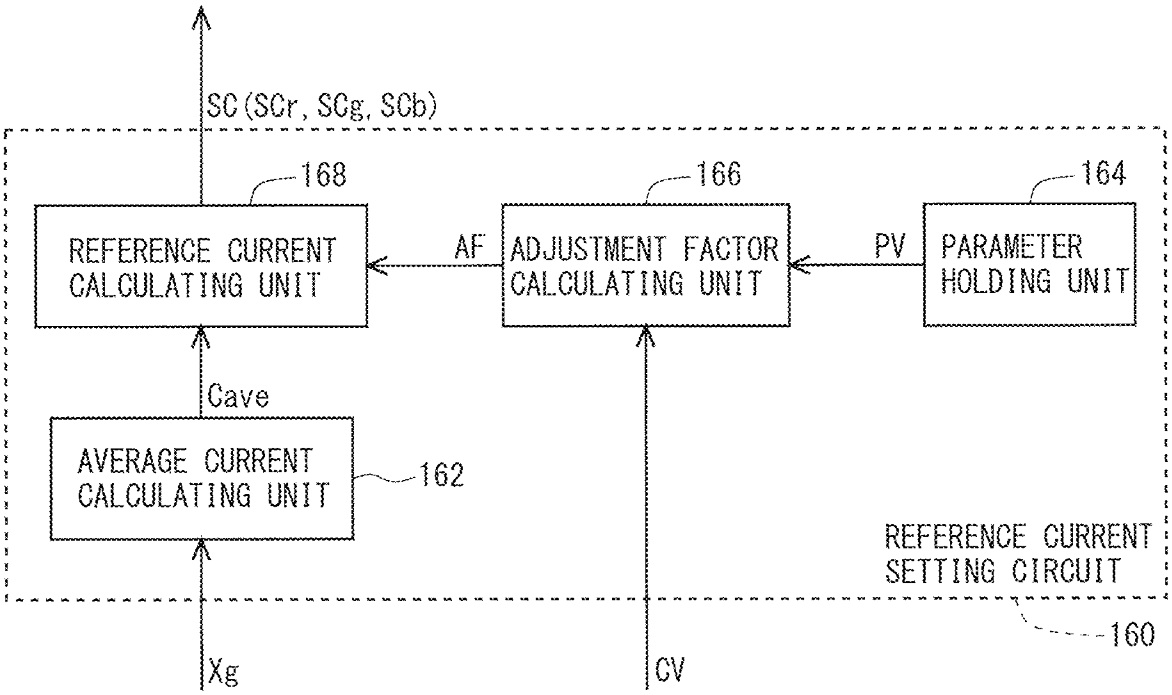
FIG. 24 is a block diagram showing a detailed configuration of a reference current setting circuit in the variant of the second embodiment.
Figure 25:
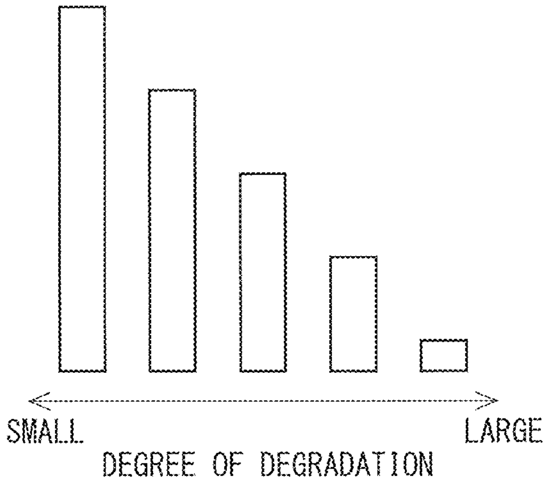
FIG. 25 is a diagram for describing how to represent the degree of degradation of a pixel.
Figure 26:
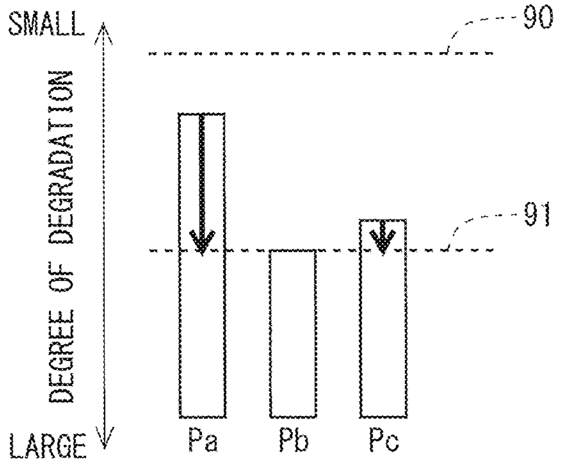
FIG. 26 is a diagram for describing a case in which compensation is performed with reference to the luminance level of the most degraded pixel in a known example.
Figure 27:
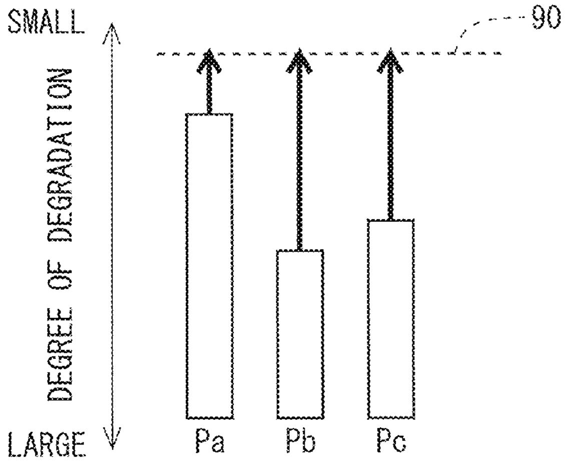
FIG. 27 is a diagram for describing a case in which compensation is performed with reference to an initial luminance level in a known example.
Figure 28:
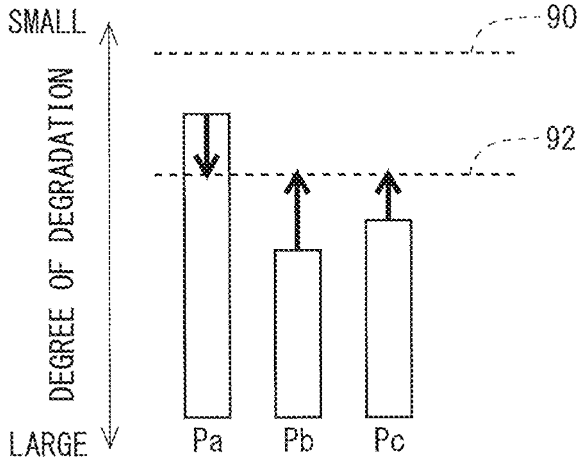
FIG. 28 is a diagram for describing a case in which compensation is performed with reference to a luminance level corresponding to an average degree of degradation of all pixels in a known example.
Figure 29:
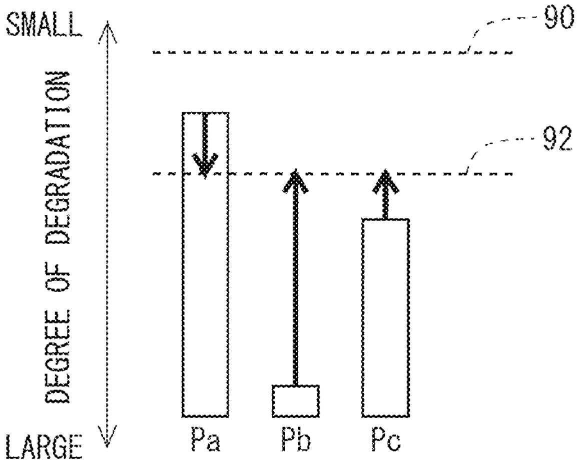
FIG. 29 is a diagram for describing a problem of the case in which compensation is performed with reference to a luminance level corresponding to an average degree of degradation of all pixels in the known example.

FIG. 24 is a block diagram showing a detailed configuration of the reference current setting circuit 160 of the present variant. Operation of the parameter holding unit 164 and the adjustment factor calculating unit 166 is the same as that in the second embodiment.

The average current calculating unit 162 calculates the pre-compensation average current Cave based on the degree of degradation Xg for green among the degrees of degradation X for one screen held in the frame memory 120. The reference current calculating unit 168 calculates the above-described base reference current by multiplying the pre-compensation average current Cave calculated by the average current calculating unit 162 by an adjustment factor AF calculated by the adjustment factor calculating unit 166. In the present variant, the variation coefficient CV and the pre-compensation average current Cave are calculated based on the degree of degradation Xg for green, and thus, the base reference current calculated by the reference current calculating unit 168 is the reference current SCg for green. The reference current SCr for red is calculated based on the base reference current (the reference current SCg for green), taking into account a difference in light-emission efficiency between green and red. Likewise, the reference current SCb for blue is calculated based on the base reference current (the reference current SCg for green), taking into account a difference in light-emission efficiency between green and blue.

According to the present variant described above, the amount of computation required to calculate a variation coefficient CV can be reduced compared to that in the second embodiment. Regarding this, since the variation coefficient CV is calculated based on the degree of degradation Xg for green, taking into account early degradation of an organic EL element that emits green light, a reduction in compensation accuracy associated with the reduction in the amount of computation is suppressed.

<3. Others>

In each of the above-described embodiments (including the variants), an organic EL display device is described as an example, but the display device is not limited thereto. The content of the present disclosure can be applied to any display device including display elements driven by current (display elements whose luminance or transmittance is controlled by current). For example, the content of the present disclosure can also be applied to an inorganic EL display device including inorganic light-emitting diodes, a QLED display device including quantum dot light emitting diodes (QLEDs), etc.

In the first embodiment, in an organic EL display device that performs monochrome display, reference luminance is set based on an index value (a variation coefficient CV of the degrees of degradation X), and a compensation computation process is performed based on the reference luminance. However, in the organic EL display device that performs monochrome display, as in the second embodiment, the configuration may be such that a reference current corresponding to reference luminance is set based on an index value (a variation coefficient CV of the degrees of degradation X) and a compensation computation process is performed based on the reference current. In this case, the reference current setting circuit 160 shown in FIG. 20 calculates reference current SC corresponding to reference luminance without calculating the base reference current. Specifically, the reference current setting circuit 160 sets the reference current SC corresponding to reference luminance, based on the degrees of degradation X for one screen held in the frame memory 120 and a variation coefficient CV calculated by the variation coefficient calculating circuit

130. Upon the setting, when the variation coefficient CV is less than or equal to a threshold value which is prepared in advance, the reference current SC is set to the pre-compensation average current Cave, and when the variation coefficient CV is greater than the threshold value, the reference current SC is set to current smaller than the pre-compensation average current Cave. Note that as in the second variant of the first embodiment (see FIG. 17), the reference current SC may be set to smaller current as the variation coefficient CV increases without comparing the variation coefficient CV with the threshold value. In addition, the reference current calculating unit 168 shown in FIG. 22 calculates the reference current SC by multiplying the pre-compensation average current Cave calculated by the average current calculating unit 162 by an adjustment factor AF calculated by the adjustment factor calculating unit 166.

In the second embodiment, in an organic EL display device that performs color display, reference currents corresponding to reference luminance are set based on an index value (a variation coefficient CV of the degrees of degradation X), and a compensation computation process is performed based on the reference currents. However, in the organic EL display device that performs color display, as in the first embodiment, the configuration may be such that reference luminance is set based on an index value (a variation coefficient CV of the degrees of degradation X) and a compensation computation process is performed based on the reference luminance. In this case, the setting of reference luminance SB by the reference luminance setting circuit 140 shown in FIG. 4 is performed for each color. Specifically, the reference luminance setting circuit 140 calculates base reference luminance used as a base for calculating reference luminance SB for each color, based on a variation coefficient CV calculated by the variation coefficient calculating circuit 130, and sets, for each color, reference luminance SB depending on light-emission efficiency based on the base reference luminance. Upon the calculation, when the variation coefficient CV is less than or equal to a threshold value which is prepared in advance, the base reference luminance is set to pre-compensation average luminance Bave, and when the variation coefficient CV is greater than the threshold value, the base reference luminance is set to luminance lower than the pre-compensation average luminance Bave. Note that as in the second variant of the first embodiment (see FIG. 17), the base reference luminance may be set to lower luminance as the variation coefficient CV increases without comparing the variation coefficient CV with the threshold value. In addition, the reference luminance calculating unit 148 shown in FIG. 16 calculates base reference current by multiplying pre-compensation average luminance Bave calculated by the average luminance calculating unit 142 by an adjustment factor AF calculated by the adjustment factor calculating unit 146, and calculates reference luminance SB for each color based on the base reference current, taking into account light-emission efficiency for each of red, green, and blue.

DESCRIPTION OF REFERENCE CHARACTERS

10: CONTROL CIRCUIT
20: SOURCE DRIVER
30: DISPLAY UNIT
32: GATE DRIVER
110: DEGREE-OF-DEGRADATION CALCULATING CIRCUIT
120: FRAME MEMORY
130: VARIATION COEFFICIENT CALCULATING CIRCUIT
140: REFERENCE LUMINANCE SETTING CIRCUIT
142: AVERAGE LUMINANCE CALCULATING UNIT
144, 164: PARAMETER HOLDING UNIT
146, 166: ADJUSTMENT FACTOR CALCULATING UNIT
148: REFERENCE LUMINANCE CALCULATING UNIT
150: COMPENSATION COMPUTING CIRCUIT
160: REFERENCE CURRENT SETTING CIRCUIT
168: REFERENCE CURRENT CALCULATING UNIT
210: DATA LINE DRIVING UNIT
220: CURRENT MONITORING UNIT
310: PIXEL CIRCUIT
311: ORGANIC EL ELEMENT
T2: DRIVE TRANSISTOR
CV: VARIATION COEFFICIENT
X: DEGREE OF DEGRADATION

The invention claimed is:

1. A display device including a plurality of pixel circuits each including a display element driven by current and a drive transistor for controlling current to be supplied to the display element, the display device comprising:

a degree-of-degradation obtaining circuit configured to determine a degree of degradation representing a level of degradation of a compensation-target circuit element included in each of K pixel circuits, the compensation-target circuit element being at least one of the display element and the drive transistor, and the K pixel circuits being some or all of the plurality of pixel circuits;

an index value calculating circuit configured to calculate, as an index value, a value depending on a deviation determined based on degrees of degradation of the K pixel circuits;

a reference luminance setting circuit configured to set reference luminance based on the index value, the reference luminance being luminance used as a reference for determining display luminance of the display element after degradation compensation; and a compensation computing circuit configured to compensate for degradation of the compensation-target circuit elements by correcting input video signals based on the reference luminance and the degree of degradation of each of the K pixel circuits, upon generating video signals to be supplied to the plurality of pixel circuits.

2. The display device according to claim 1, wherein the index value calculated by the index value calculating circuit increases as the deviation determined based on the degrees of degradation of the K pixel circuits increases, and the reference luminance setting circuit sets the reference luminance to a smaller value as the index value increases.

3. The display device according to claim 1, wherein the index value calculated by the index value calculating circuit increases as the deviation determined based on the degrees of degradation of the K pixel circuits increases, and the reference luminance setting circuit determines average luminance of K display elements included in the K pixel circuits for a case in which the K display elements emit light based on a predetermined gradation value in a state in which degradation of the compensation-target circuit element is not compensated for, and sets the reference luminance to the average luminance when the index value is less than or equal to a threshold value prepared in advance, and sets the reference luminance to a value smaller than the average luminance when the index value is greater than the threshold value.

4. The display device according to claim 3, wherein the reference luminance setting circuit includes:

a parameter holding unit configured to hold, as parameters, a value, on a horizontal axis, of a critical point on a graph and a slope between adjacent critical points on the graph, so that the graph can be obtained, the graph having a value that the index value can take as the horizontal axis and having a value that an adjustment factor for calculating the reference luminance can take as a vertical axis, and the graph representing a correspondence between the index value and the adjustment factor;

an adjustment factor calculating unit configured to calculate the adjustment factor based on the parameters and the index value;

an average luminance calculating unit configured to calculate the average luminance based on the degrees of degradation of the K pixel circuits; and a reference luminance calculating unit configured to calculate the reference luminance by multiplying the average luminance by the adjustment factor.

5. The display device according to claim 1, wherein the plurality of pixel circuits include pixel circuits for red, pixel circuits for green, and pixel circuits for blue, the index value calculating circuit calculates an index value common to all colors, as the index value, and the reference luminance setting circuit calculates, based on the index value, base reference luminance used as a base for calculating reference luminance for each color, and sets, based on the base reference luminance, the reference luminance depending on light-emission efficiency for each color.

6. The display device according to claim 5, wherein the index value calculated by the index value calculating circuit increases as the deviation determined based on the degrees of degradation of the K pixel circuits increases, and the reference luminance setting circuit sets the base reference luminance to a smaller value as the index value increases.

7. The display device according to claim 5, wherein the index value calculated by the index value calculating circuit increases as the deviation determined based on the degrees of degradation of the K pixel circuits increases, and the reference luminance setting circuit determines average luminance of K display elements included in the K pixel circuits for a case in which the K display elements emit light based on a predetermined gradation value in a state in which degradation of the compensation-target circuit element is not compensated for, and sets the base reference luminance to the average luminance when the index value is less than or equal to a threshold value prepared in advance, and sets the base reference luminance to a value smaller than the average luminance when the index value is greater than the threshold value.

8. The display device according to claim 7, wherein the reference luminance setting circuit includes:

a parameter holding unit configured to hold, as parameters, a value, on a horizontal axis, of a critical point on a graph and a slope between adjacent critical points on the graph, so that the graph can be obtained, the graph having a value that the index value can take as the horizontal axis and having a value that an adjustment factor for calculating the reference luminance can take as a vertical axis, and the graph representing a correspondence between the index value and the adjustment factor;

an adjustment factor calculating unit configured to calculate the adjustment factor based on the parameters and the index value;

an average luminance calculating unit configured to calculate the average luminance based on the degrees of degradation of the K pixel circuits; and a reference luminance calculating unit configured to calculate the base reference luminance by multiplying the average luminance by the adjustment factor, and calculate the reference luminance for each color based on the base reference luminance.

9. The display device according to claim 8, wherein the K pixel circuits are the pixel circuits for green, and with the base reference luminance being reference luminance for green, the reference luminance calculating unit calculates, based on the base reference luminance, reference luminance for red and reference luminance for blue.

10. The display device according to claim 5, wherein the K pixel circuits include the pixel circuits for red, the pixel circuits for green, and the pixel circuits for blue.

11. The display device according to claim 5, wherein the K pixel circuits are the pixel circuits for green.

12. The display device according to claim 1, wherein the degree-of-degradation obtaining circuit includes:

a current measuring circuit configured to measure, for each of the K pixel circuits, current flowing through the compensation-target circuit element under a predetermined condition; and a degree-of-degradation calculating circuit configured to calculate the degree of degradation based on the current measured by the current measuring circuit.

13. A display device including a plurality of pixel circuits each including a display element driven by current and a drive transistor for controlling current to be supplied to the display element, the display device comprising:

a degree-of-degradation obtaining circuit configured to determine a degree of degradation representing a level of degradation of a compensation-target circuit element included in each of K pixel circuits, the compensation-target circuit element being at least one of the display element and the drive transistor, and the K pixel circuits being some or all of the plurality of pixel circuits;

an index value calculating circuit configured to calculate, as an index value, a value depending on a deviation determined based on degrees of degradation of the K pixel circuits;

a reference current setting circuit configured to set a reference current corresponding to reference luminance based on the index value, the reference luminance being luminance used as a reference for determining display luminance of the display element after degradation compensation; and a compensation computing circuit configured to compensate for degradation of the compensation-target circuit elements by correcting input video signals based on the reference current and the degree of degradation of each of the K pixel circuits, upon generating video signals to be supplied to the plurality of pixel circuits.

14. The display device according to claim 13, wherein
the index value calculated by the index value calculating circuit increases as the deviation determined based on the degrees of degradation of the K pixel circuits increases, and
the reference current setting circuit
determines average current corresponding to average luminance of K display elements included in the K pixel circuits for a case in which the K display elements emit light based on a predetermined gradation value in a state in which degradation of the compensation-target circuit element is not compensated for, and
sets the reference current to the average current when the index value is less than or equal to a threshold value prepared in advance, and sets the reference current to a value smaller than the average current when the index value is greater than the threshold value.

15. The display device according to claim 14, wherein
the reference current setting circuit includes:
a parameter holding unit configured to hold, as parameters, a value, on a horizontal axis, of a critical point on a graph and a slope between adjacent critical points on the graph, so that the graph can be obtained, the graph having a value that the index value can take as the horizontal axis and having a value that an adjustment factor for calculating the reference current can take as a vertical axis, and the graph representing a correspondence between the index value and the adjustment factor;
an adjustment factor calculating unit configured to calculate the adjustment factor based on the parameters and the index value;
an average current calculating unit configured to calculate the average current based on the degrees of degradation of the K pixel circuits; and
a reference current calculating unit configured to calculate the reference current by multiplying the average current by the adjustment factor.

16. The display device according to claim 13, wherein
the plurality of pixel circuits include pixel circuits for red, pixel circuits for green, and pixel circuits for blue,
the index value calculating circuit calculates an index value common to all colors, as the index value, and
the reference current setting circuit
calculates, based on the index value, base reference current used as a base for calculating reference current for each color, and
sets, based on the base reference current, the reference current depending on light-emission efficiency for each color.

17. The display device according to claim 16, wherein
the index value calculated by the index value calculating circuit increases as the deviation determined based on the degrees of degradation of the K pixel circuits increases, and
the reference current setting circuit sets the base reference current to a smaller value as the index value increases.

18. The display device according to claim 16, wherein
the index value calculated by the index value calculating circuit increases as the deviation determined based on the degrees of degradation of the K pixel circuits increases, and
the reference current setting circuit
determines average current corresponding to average luminance of K display elements included in the K pixel circuits for a case in which the K display elements emit light based on a predetermined gradation value in a state in which degradation of the compensation-target circuit element is not compensated for, and
sets the base reference current to the average current when the index value is less than or equal to a threshold value prepared in advance, and sets the base reference current to a value smaller than the average current when the index value is greater than the threshold value.

19. The display device according to claim 18, wherein
the reference current setting circuit includes:
a parameter holding unit configured to hold, as parameters, a value, on a horizontal axis, of a critical point on a graph and a slope between adjacent critical points on the graph, so that the graph can be obtained, the graph having a value that the index value can take as the horizontal axis and having a value that an adjustment factor for calculating the base reference current can take as a vertical axis, and the graph representing a correspondence between the index value and the adjustment factor;
an adjustment factor calculating unit configured to calculate the adjustment factor based on the parameters and the index value;
an average current calculating unit configured to calculate the average current based on the degrees of degradation of the K pixel circuits; and
a reference current calculating unit configured to calculate the base reference current by multiplying the average current by the adjustment factor, and calculate the reference current for each color based on the base reference current.

20. The display device according to claim 19, wherein
the K pixel circuits are the pixel circuits for green, and
with the base reference current being reference current for green, the reference current calculating unit calculates, based on the base reference current, reference current for red and reference current for blue.

* * * * *